(12) United States Patent
Jamali et al.

(10) Patent No.: US 11,243,448 B2
(45) Date of Patent: Feb. 8, 2022

(54) VARIFOCAL OPTICAL ASSEMBLY PROVIDING ASTIGMATISM COMPENSATION

(71) Applicant: Facebook Technologies, LLC, Menlo Park, CA (US)

(72) Inventors: Afsoon Jamali, Redmond, WA (US); Brian Wheelwright, Sammamish, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/780,770

(22) Filed: Feb. 3, 2020

(65) Prior Publication Data

US 2021/0240051 A1 Aug. 5, 2021

(51) Int. Cl.
*G02F 1/29* (2006.01)
*G02B 27/01* (2006.01)

(52) U.S. Cl.
CPC ........... *G02F 1/29* (2013.01); *G02B 27/0172* (2013.01); *G02B 2027/011* (2013.01); *G02F 2201/122* (2013.01)

(58) Field of Classification Search
CPC ........ G02B 27/0101; G02B 2027/0118; G02B 2027/012; G02B 2027/0121; G02B 2027/015; G02B 27/0955; G02B 2027/011; G02B 27/0172; G02B 5/1876; B60R 2300/205; G03B 21/604; G02F 1/133526; G02F 2201/122; G02F 1/29; H01L 51/5275

See application file for complete search history.

(56) References Cited

U.S. PATENT DOCUMENTS

| | | | |
|---|---|---|---|
| 7,728,949 B2* | 6/2010 | Clarke | G02F 1/13718 349/201 |
| 2010/0225834 A1* | 9/2010 | Li | G02F 1/29 349/13 |
| 2016/0202510 A1* | 7/2016 | Yi | G02B 30/25 349/33 |
| 2019/0302567 A1* | 10/2019 | Chen | G02F 1/133526 |
| 2020/0033694 A1* | 1/2020 | Gao | G02B 5/1876 |

* cited by examiner

*Primary Examiner* — Michael H Caley
*Assistant Examiner* — Mariam Qureshi
(74) *Attorney, Agent, or Firm* — Shumaker & Sieffert, P.A.

(57) ABSTRACT

An astigmatism compensation optical assembly includes a first liquid crystal layer disposed between opposing substrates. The astigmatism compensation optical assembly also includes a first electrode pattern disposed on at least one substrate. The first electrode pattern includes a set of parallel conductors each having a length proportional to the longest dimension of the clear aperture of the liquid crystal lens, and the parallel conductors are configured to generate a voltage distribution within the liquid crystal layer that results in the liquid crystal layer exhibiting cylindrical focal power.

17 Claims, 15 Drawing Sheets

VARIFOCAL OPTICAL ASSEMBLY PROVIDING ASTIGMATISM COMPENSATION

BACKGROUND

Optical devices, including head-mounted display devices, provide visual information to a user. For example, head-mounted displays are used for virtual reality and augmented reality operations. A head-mounted display often includes an electronic image source and an optical assembly.

Accommodation refers to a vision process in which the sciliary muscles and suspensory ligaments of a human eye cause the lens of the eye to bulge or flatten to focus objects on the retina. If accommodation of an eye is imperfect, parallel light rays incident on the lens can converge to a point behind the retina (hypermetropia, or farsightedness) or a point in front of the retina (myopia, or nearsightedness). To correct these visual defects, a converging lens of an appropriate focal length is placed in front of a hypermyotropic eye, and a diverging lens of an appropriate focal length is placed in front of a myopic eye. Lenses placed in front of the eye provide a spherical correction, the degree of which depends on the focal length of the lens in positive or negative diopters (D).

Astigmatism is another common type of refractive error in which the eye does not focus light evenly onto the retina and occurs when light is bent differently depending on where it strikes the cornea and passes through the lens of the eye. As a result, the eye is unable to focus light rays to a single point, and vision becomes out of focus at any distance. The cornea of a normal eye is curved like a basketball, with the same radius of curvature in all areas. An eye with astigmatism has a cornea that is curved more like a football, with some areas that are steeper or more rounded than others (e.g., a varying radius of curvature). In other cases, the lens inside the eye can be irregularly curved, or both the cornea and the lens can be irregularly curved. Astigmatism can cause images to appear blurry and stretched out, and can result in headaches, eyestrain, squinting, and distorted or blurred vision.

SUMMARY

A varifocal optical assembly could be used in an optical device such as a head mounted display such that a displayed image of an object is properly focused on the retina of the eyes of the display observer. In the optical assemblies, a focal length of a segmented phase profile liquid crystal lens, e.g. a Fresnel liquid crystal lens, can be adjusted by changing the voltages applied to conductors controlling the optical phase profile via control of the local liquid crystal director alignment. The overall optical power of the varifocal optical assemblies can be varied by to provide spherical correction and enhance accommodation for the observer.

In general, the present disclosure is directed to a varifocal optical assembly that provides astigmatism compensation and can be used as a component of the optical system of a display device (e.g., a head-mounted display device). The varifocal optical assembly includes an optical stack that can be configured to enhance the accommodation of one or both eyes of a display observer by providing both astigmatic and, optionally, spherical correction to increase the observer's overall comfort and enjoyment while using the display device.

The varifocal optical assembly includes an astigmatic lensing optical assembly that can form an optical stack between the display and one or both eyes of the observer. The astigmatic lensing optical assembly can provide a cylinder correction in +D or −D and a cylinder axis orientation over of a range of angles of 0° to 180° for each eye like a corrective spectacle lens. The astigmatic lensing optical assemblies are thin and lightweight, which reduces the overall weight of a head mounted display (or any optical device), and provides a more optimal device form factor, either or both of which can enhance the viewing experience for the observer. Additionally, the astigmatic lensing optical assemblies are configurable, such that a single astigmatic lensing optical assemblies can be controlled to provide a range of astigmatism correction in both power and angle.

In some examples, the disclosure describes a varifocal optical assembly including a first liquid crystal lens assembly including a liquid crystal layer disposed between opposing substrates. The varifocal optical assembly also includes a first electrode pattern disposed on at least one substrate, wherein the first electrode pattern includes a set of parallel conductors each having a length proportional to the longest dimension of the clear aperture of the liquid crystal lens, wherein the parallel conductors are configured to generate a voltage distribution within the liquid crystal layer that results in the liquid crystal layer exhibiting cylindrical focal power.

In some examples, the disclosure describes a head mounted display including a display configured to emit image light, and a varifocal optical assembly configured to provide astigmatism compensation. In addition, the varifocal optical assembly includes a first liquid crystal lens assembly including a liquid crystal disposed between opposing substrates. The varifocal optical assembly also includes a first electrode pattern disposed on at least one substrate, wherein the first electrode pattern includes a set of parallel conductors each having a length proportional to the longest dimension of the clear aperture of the liquid crystal lens, wherein the parallel conductors are configured to generate a voltage distribution within the liquid crystal layer that results in the liquid crystal layer exhibiting cylindrical focal power.

In some examples, the disclosure describes a method including transmitting light through a varifocal optical assembly configured to provide astigmatism compensation comprising a of plurality of electrode patterns disposed on at least one substrate of a liquid crystal lens assembly. The plurality of electrode patterns each include a set of parallel conductors, and the plurality of electrode patterns are electrically isolated from each other by an insulator and rotated at an angle with respect to each other. The method further includes determining an astigmatism correction axis, and adjusting the cylindrical focal power of the varifocal optical assembly configured to provide astigmatism compensation by changing the voltage applied to the conductors of the electrode pattern of the plurality of electrode patterns having conductors the most parallel to the astigmatism correction axis.

Thus, the disclosed embodiments provide display devices with adjustable optical power to decrease eye fatigue and improve user comfort and satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures. The figures are not drawn to scale unless indicated otherwise.

Like symbols in the drawings indicate like elements.

DETAILED DESCRIPTION

The present disclosure is directed to a varifocal optical assembly that provides astigmatism compensation and a display device (e.g., a head-mounted display device) including the varifocal optical assembly. The varifocal optical assembly includes an astigmatism compensation optical module and, optionally, a spherically lensing optical module. The disclosed examples can be used to compensate a user's astigmatism and, optionally, to reduce the vergence-accommodation conflict that a user may experience while using the display device, thereby increasing the user's overall comfort and enjoyment while using the display device. In some examples, the astigmatism compensation optical assembly and the spherically lensing optical module are combined in a single module that includes multiple layers of electrodes separated by dielectrics and adjacent one or more liquid crystal cells.

Figure 1:
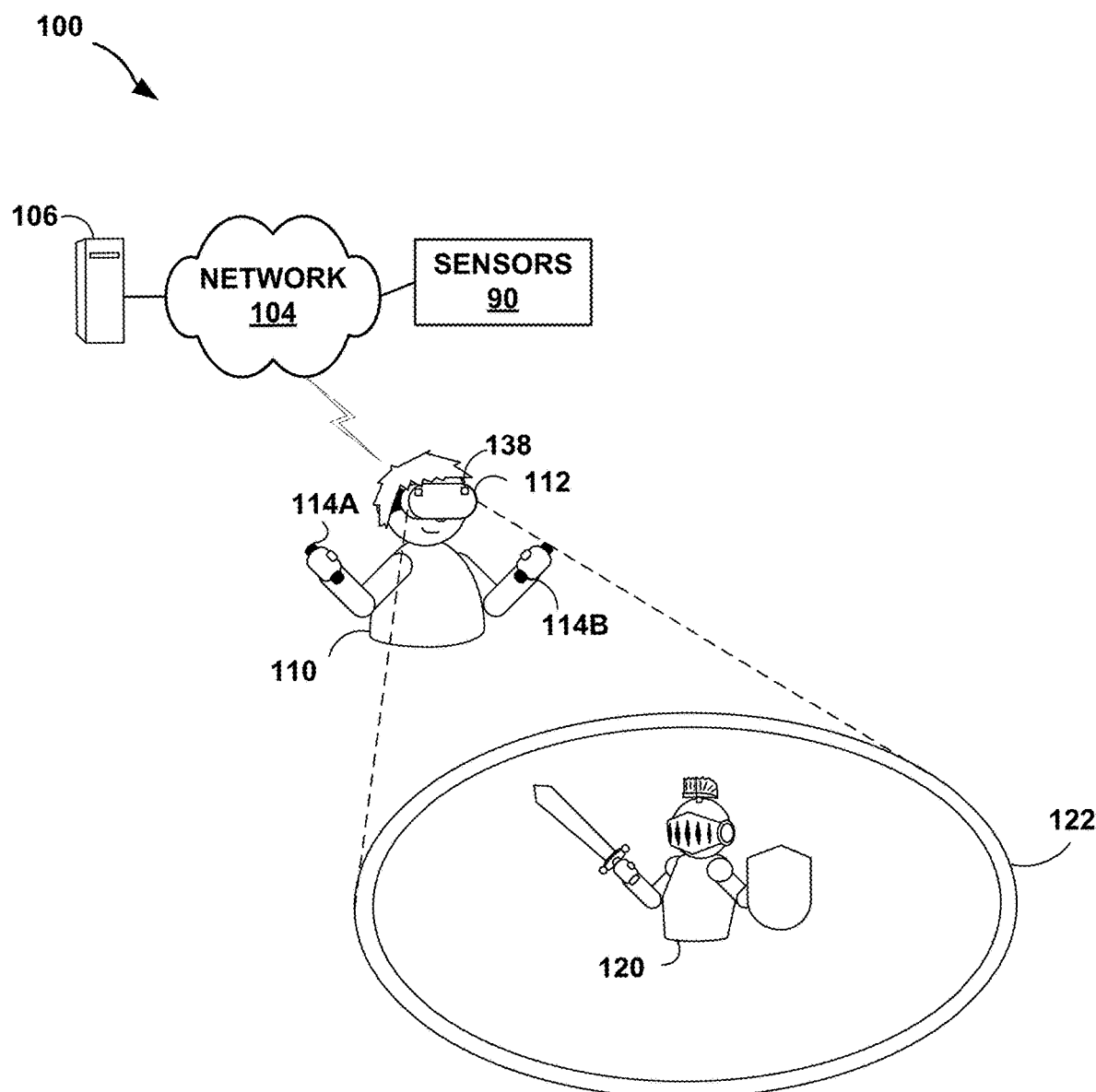
FIG. 1 is an illustration depicting an example artificial reality system that includes a varifocal optical assembly that provides astigmatism compensation, in accordance with the techniques described in this disclosure.

FIG. 1 is an illustration depicting an example artificial reality system includes a varifocal optical assembly that provides astigmatism compensation, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of user 110.

To provide a comfortable viewing experience for user 110, HMD 112 may include a lens system for focusing light output by a display device of HMD 112 at the eyes of user 110. To further enhance user comfort and reduce the vergence-accommodation conflict that user 110 may experience while using HMD 112, an optical assembly or system of HMD 112 may include a varifocal optical assembly, which changes apparent depth of images by changing focal states. While this may reduce vergence-accommodation conflict, user 110 may still need to wear prescription optics (such a prescription eyeglasses) to compensate for astigmatism. Wearing prescription optics may interfere with the fit of HMD 112, reducing comfort of user 110.

In accordance with the techniques of this disclosure, HMD 112 includes a varifocal optical assembly configured to provide astigmatism compensation. The varifocal optical assembly may include an astigmatism compensation optical module and, optionally, a spherically lensing optical module. The varifocal optical assembly may include one or more Fresnel structures, i.e., one or more Fresnel liquid crystal lenses. The Fresnel liquid crystal lens may include any appropriate type of Fresnel structure, such as a Fresnel zone plate lens including areas that have a phase difference of a half-wave to adjacent areas, a diffractive Fresnel lens having a segmented parabolic phase profile where the segments are small and can result in significant diffraction, or a refractive Fresnel lens having a segmented parabolic profile where the segments are large enough so that diffraction effects are minimized. Other structures may also be used. In some examples, the varifocal optical assembly may include a refractive Fresnel liquid crystal lens having a segmented parabolic profile, where the segments are large enough such that the diffraction angle is smaller than the angular resolution of human eyes, i.e., diffraction effects are not observable by human eyes. Such a refractive Fresnel liquid crystal lens is referred to as a segmented phase profile (SPP) LC lens. In some examples, a Fresnel structure can be polarization insensitive, for example, by combining one Fresnel structure providing optical power for a first polarization of light with another Fresnel structure providing optical power for a second polarization of light, where the second polarization of light is orthogonal to the first polarization of light. Additionally, or alternatively, the spherically lensing optical module may include one or more liquid lenses, one or more movable conventional lenses, one or more a pancake lens, or combinations thereof.

Additionally, by controlling an orientation of the directors of the liquid crystal (LC) molecules within the Fresnel structures (e.g., by application of a voltage to transparent conductors resulting in a parabolic phase profile across a dimension of the Fresnel structure) the Fresnel structure or structures may be configured to provide a selected type of lensing. As such, the lenses or gratings within the optional spherically lensing optical module may have LC directors oriented in a pattern configured to provide spherical lensing, while lenses or gratings within the astigmatism compensation optical assembly may have LC directors oriented in a pattern configured to provide cylindrical lensing along a selected axis. For example, the astigmatism compensation optical assembly may include a first astigmatism compensation module and a second astigmatism compensation module. The first astigmatism compensation module may be configured to compensate for astigmatism in a first axis (e.g., vertical astigmatism) and the second astigmatism compensation module may be configured to compensate for astigmatism in a second axis (e.g., oblique astigmatism at a particular azimuth angle relative to vertical).

In some examples, multiple astigmatism compensation optical modules and/or the optional spherically lensing optical module may be combined in a single module that includes multiple layers of electrodes separated by dielectrics and adjacent one or more liquid crystal cells. For example, a single LC cell or set of LC cells may be exposed to an electric field that is a combination of electric fields generated by multiple layers of electrodes adjacent the single LC cell or set of LC cells. For example, three electrode layers may be adjacent to the single LC cell or set of LC cells. A first electrode layer may include electrode(s) configured to generate an electric field within the single LC cell or set of LC cells that causes the LC directors to orient to provide spherical lensing of a selected optical power. A second electrode layer may include electrode(s) configured to generate an electric field within the single LC cell or set of LC cells that causes the LC directors to orient to provide cylindrical lensing of a selected optical power and at a first selected axis. A third electrode layer may include electrode(s) configured to generate an electric field within the single LC cell or set of LC cells that causes the LC directors to orient to provide cylindrical lensing of a selected optical power and at a second selected axis (that is different than the first selected axis). By applying selected voltages to the three electrode layers, the combined electric field in the single LC cell or set of LC cells may result in orientations of the LC directors to provide cylindrical lensing of a selected power and axis, along with spherical lensing of a selected power.

By including astigmatism compensation in multiple axes with controllable optical power for each, the varifocal optical systems or assemblies described herein may provide for astigmatism compensation of a selected power and axis without requiring user 110 to wear prescription optics, thus increasing comfort of user 110 and improving the experience of user 110 when using HMD 112.

Figure 2A:
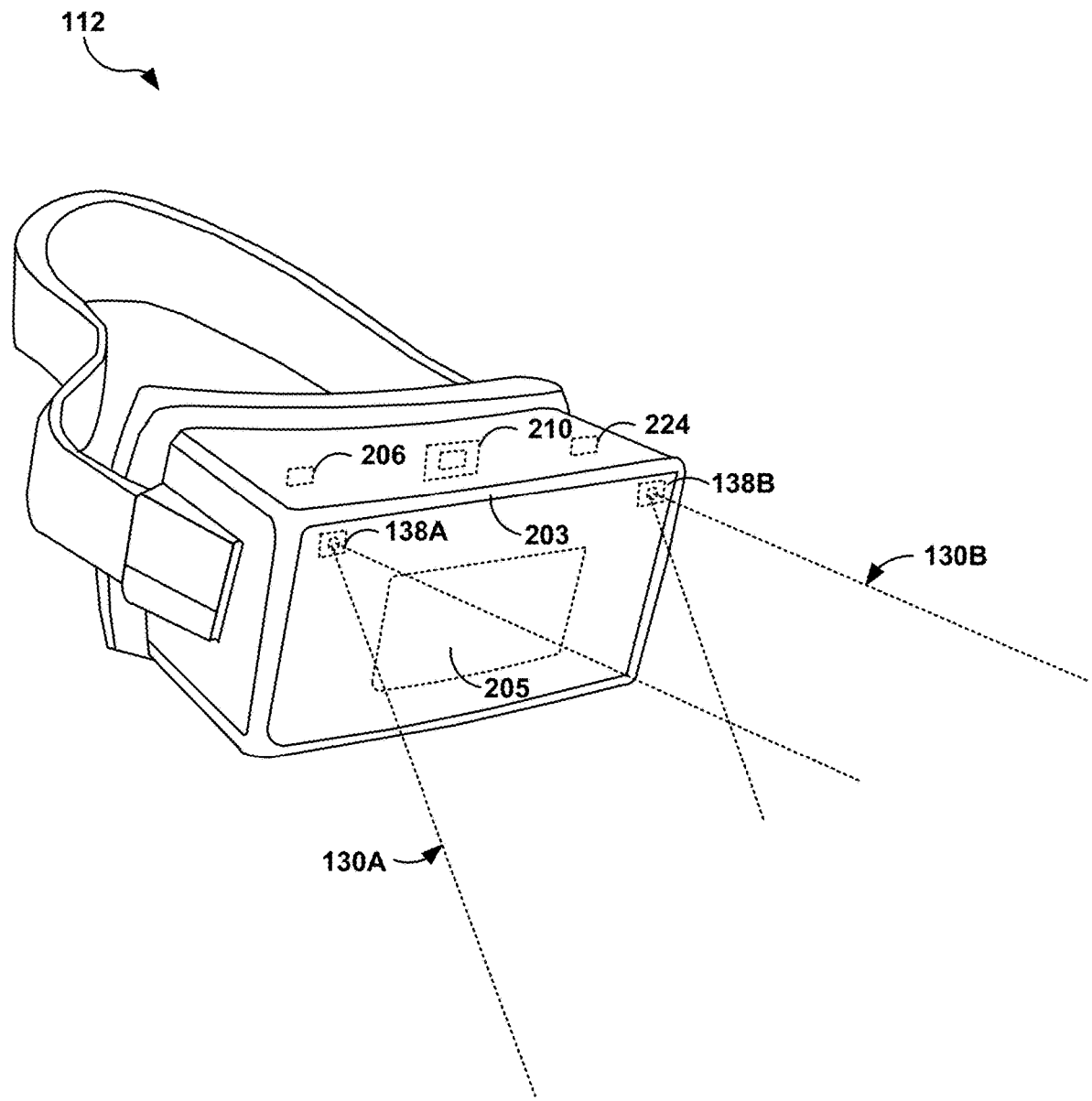
FIG. 2A is an illustration depicting an example HMD that includes a varifocal optical assembly that provides astigmatism compensation, in accordance with techniques described in this disclosure.

FIG. 2A is an illustration depicting an example HMD 112 that includes a varifocal optical system that provides astigmatism compensation, in accordance with techniques described in this disclosure. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user via a varifocal optical system 205. Electronic display 203 may be any suitable display technology, as described above. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

Varifocal optical system 205 includes optical elements configured to manage light output by electronic display 203 for viewing by the user of HMD 112 (e.g., user 110 of FIG. 1). The optical elements may include, for example, one or more lens, one or more diffractive optical element, one or more reflective optical elements, one or more waveguides, or the like, that manipulates (e.g., focuses, defocuses, reflects, refracts, diffracts, or the like) light output by electronic display 203. For example, varifocal optical system 205 may be any of the varifocal optical systems described herein with reference to FIGS. 1 and 6-12.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
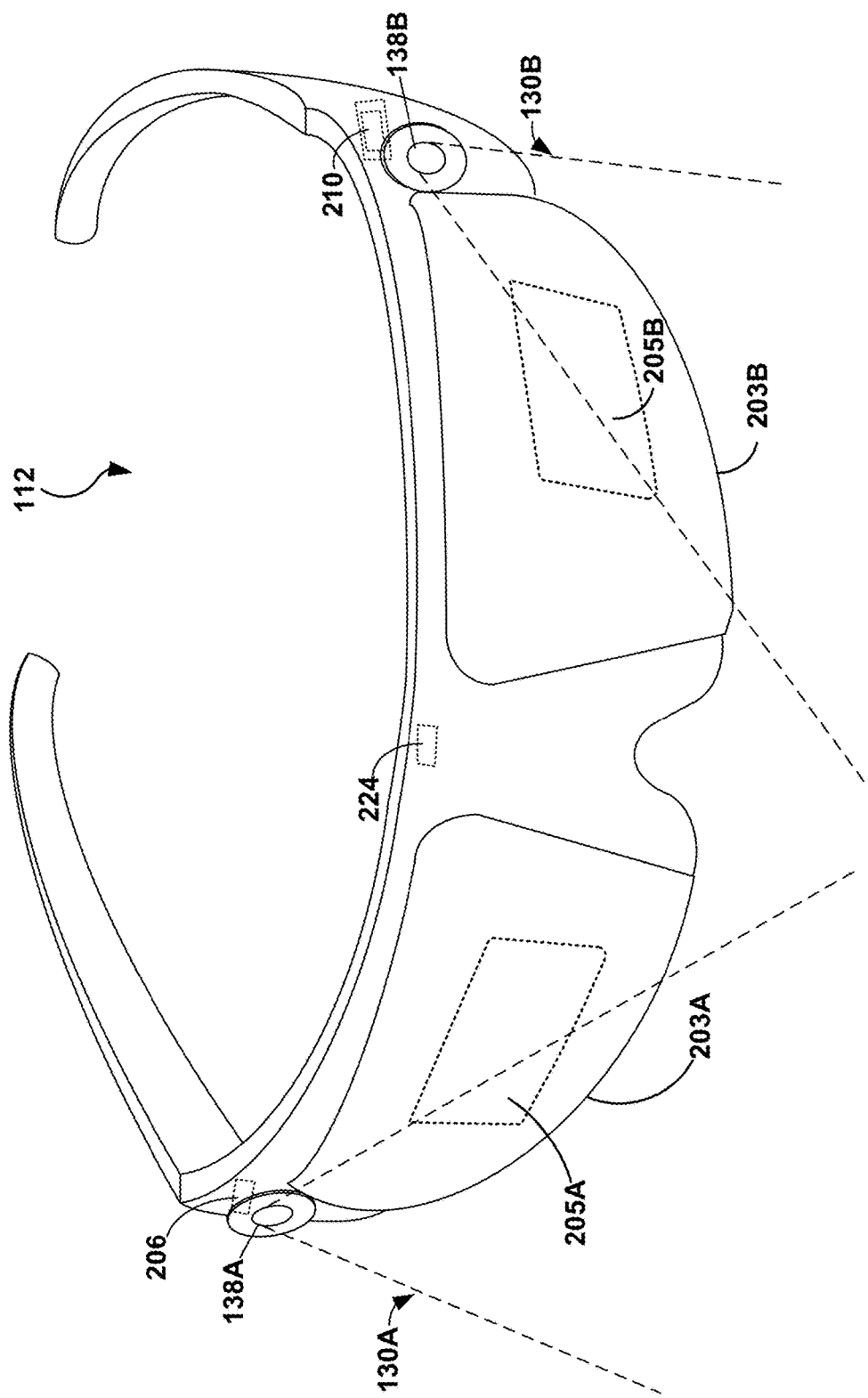
FIG. 2B is an illustration depicting another example HMD that includes a varifocal optical assembly that provides astigmatism compensation, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes one or more interior-facing electronic displays 203A and 203B (collectively, "electronic displays 203") configured to present artificial reality content to the user and one or more varifocal optical systems 205A and 205B (collectively, "varifocal optical systems 205") configured to manage light output by interior-facing electronic displays 203. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on display 203.

Figure 3:
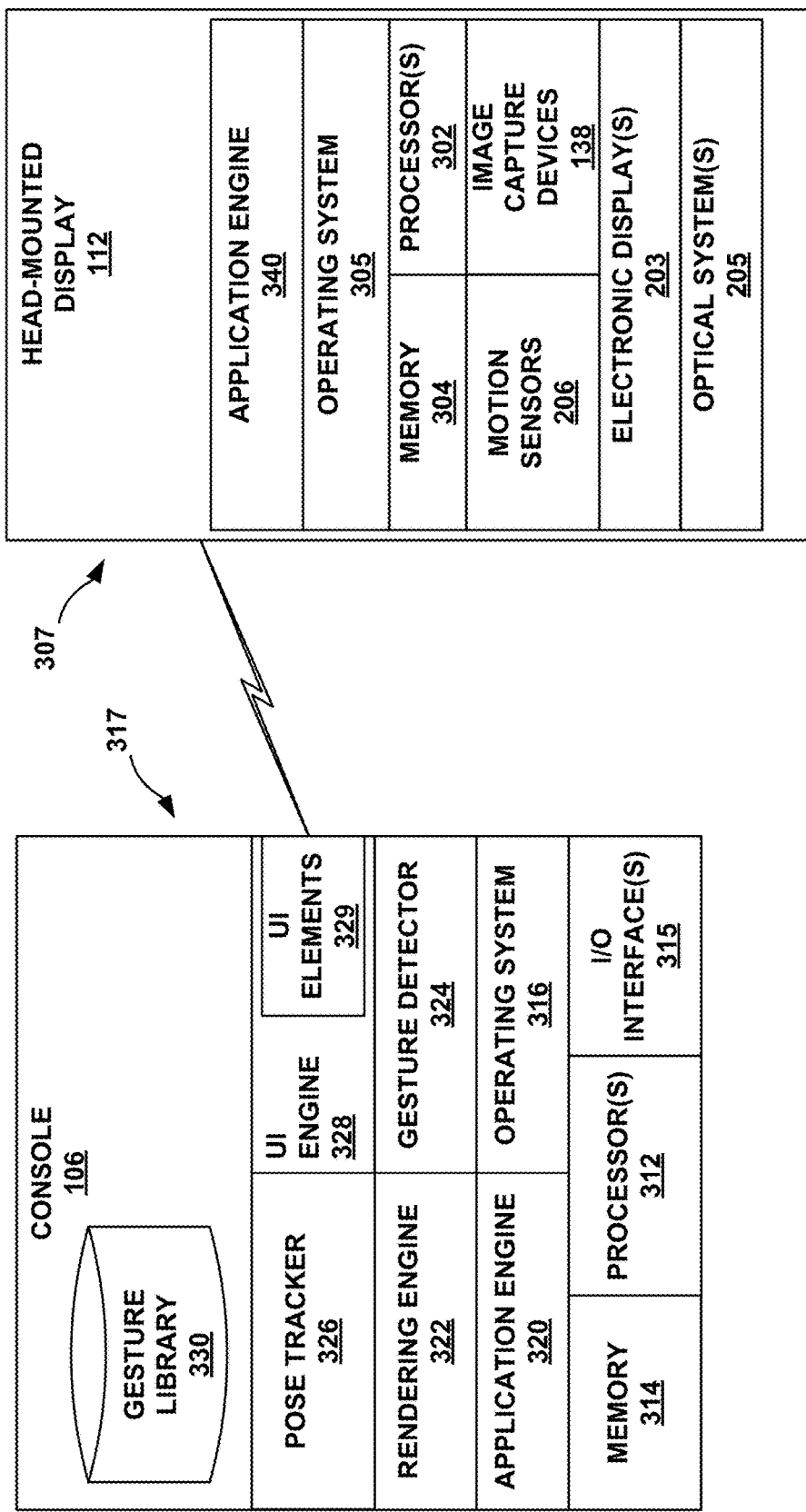
FIG. 3 is a block diagram showing example implementations of a console and an HMD of the artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206, image capture devices 138, and, in some examples, optical system 205. In some examples, processors 302 and memory 304 may be separate, discrete components. In other examples, memory 304 may be on-chip memory collocated with processors 302 within a single integrated circuit.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

In accordance with the techniques described herein, varifocal optical system(s) 205 may be configured to also provide astigmatism compensation. For example, varifocal optical system(s) 205 may include a spherically lensing optical module and an astigmatism compensation optical assembly (e.g., at least one astigmatism compensation optical module). The spherically lensing optical module and at least one astigmatism compensation optical module may be any of those described herein.

Figure 4:
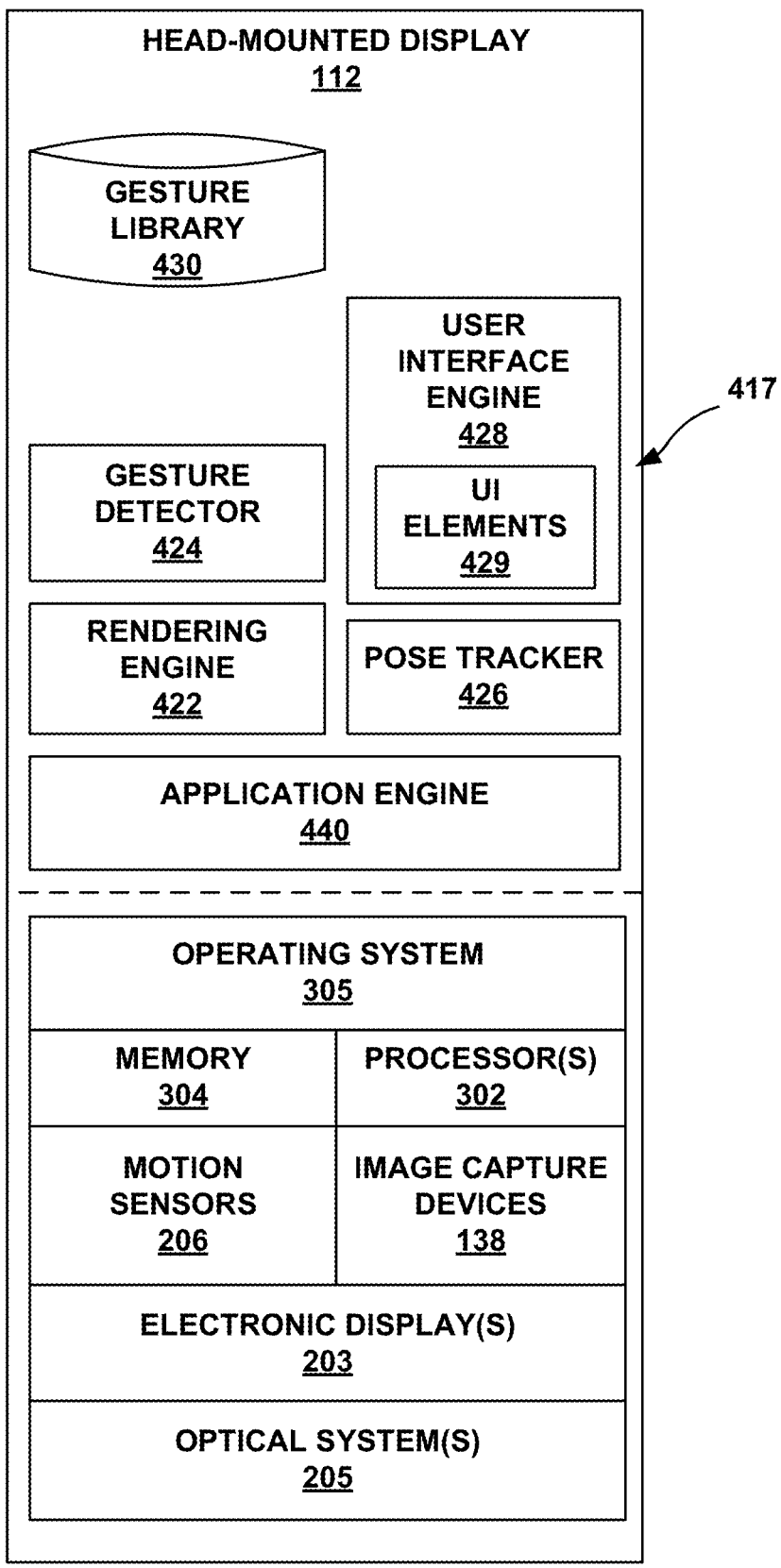
FIG. 4 is a block diagram depicting an example HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multi-tasking operating system, for instance, or other type of operating system. In turn, operating system 305 provides a multitasking operating environment for executing one or more software components 417. Moreover, processor(s) 302 are coupled to electronic display(s) 203, varifocal optical system(s) 205, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
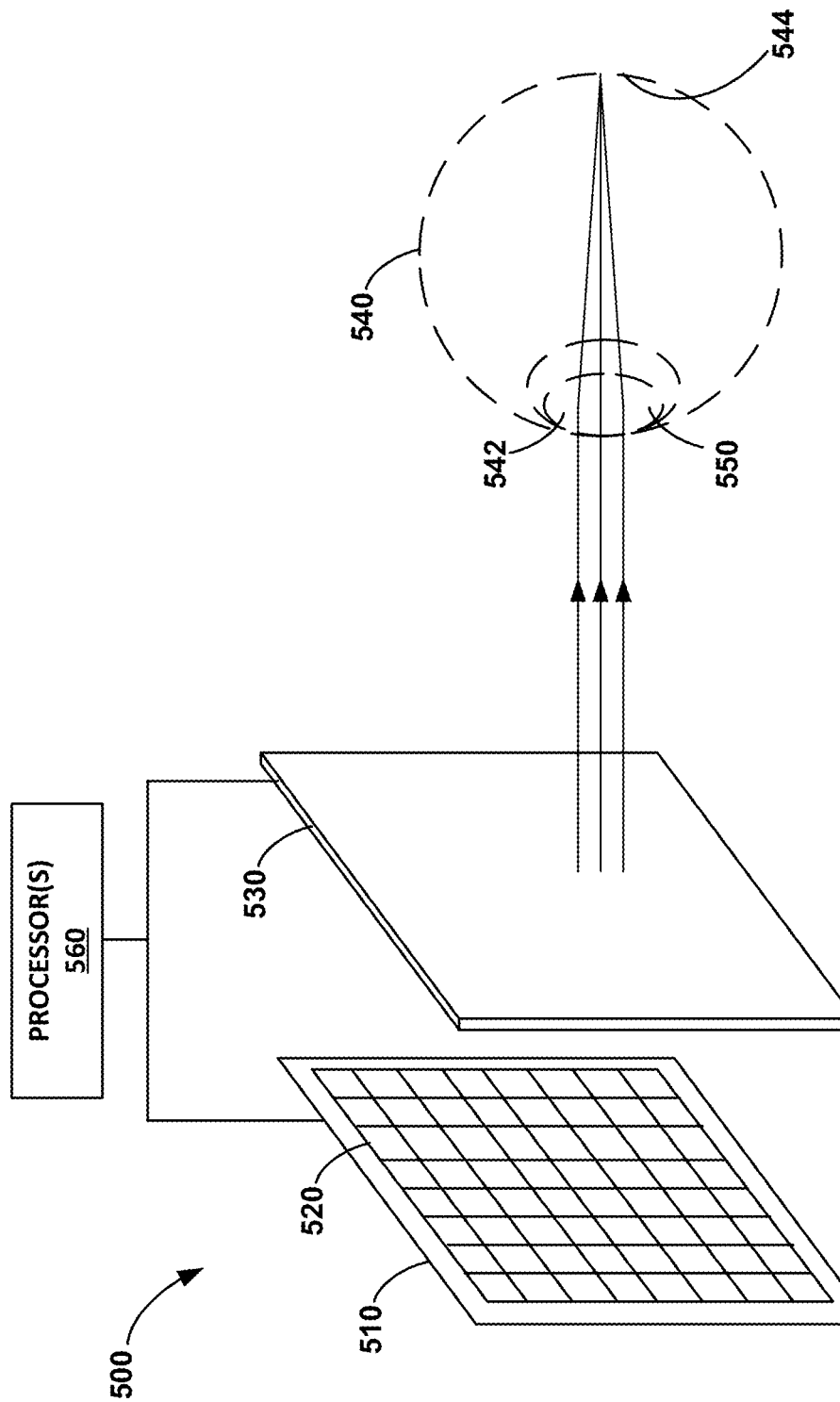
FIG. 5 is a schematic perspective view of an embodiment of a display device, in accordance with the techniques described in this disclosure.

FIG. 5 is an isometric view of an example display device 500, which includes components of the display(s) 203 and optical system(s) 205 of FIGS. 2A-4. In some examples, display device 500 includes light emission device array 510 and a varifocal optical system 530 that provides astigmatism compensation. Light emission device array 510 emits image light toward the viewing user. Light emission device array 510 may be, e.g., an array of LEDs, an array of microLEDs, an array of OLEDs, or some combination thereof. Light emission device array 510 includes light emission devices 520 that emit light in the visible range.

In some examples, display device 500 includes an emission intensity array configured to selectively attenuate light emitted from light emission array 510. In some examples, the emission intensity array is composed of a plurality of liquid crystal cells or pixels, groups of light emission devices, or some combination thereof. Each of the liquid crystal cells is, or in some examples, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array can control what portion of the image light emitted from light emission device array 510 is passed to varifocal optical system 530. In some examples, display device 500 uses an emission intensity array to facilitate providing image light to a location of pupil 550 of eye 540 of a user and minimize the amount of image light provided to other areas in the eyebox.

Varifocal optical system 530 receives the image light (e.g., attenuated light) from emission intensity array (or directly from emission device array 510) and directs the image light to a location of pupil 550, where the image light is focused by the lens 342 of the eye 340 onto the retina 344. While focusing the image light to the location of pupil 550, varifocal optical system 530 may provide both spherical and cylindrical lensing to provide astigmatism compensation for the user.

In some examples, display device 500 includes one or more broadband sources (e.g., one or more white LEDs) coupled with a plurality of color filters, in addition to, or instead of, light emission device array 510.

Varifocal optical system 530 includes one or more Fresnel structures, such as lenses or gratings formed from liquid crystals. Examples of Fresnel structures formed from liquid crystals include Fresnel zone plate lenses including areas that have a phase difference of a half-wave to adjacent areas, diffractive Fresnel lenses having a segmented parabolic phase profile where the segments are small and can result in significant diffraction, refractive Fresnel lenses having a segmented parabolic profile where the segments are large enough so that diffraction effects are minimized, for example, segmented phase profile (SPP) LC lenses. The optical system may be controlled to have a selected total optical power, and in this way, the optical system may be a varifocal optical system.

As mentioned above with respect to FIG. 1, varifocal optical system 530 may include an astigmatism compensation optical assembly and an optional spherically lensing optical module. The astigmatism compensation optical assembly may include a plurality of astigmatism compensation optical modules. Each astigmatism compensation optical module may provide astigmatism compensation along a selected axis with controllable optical power, e.g. cylindrical lensing, along the selected axis. At least some of the Fresnel structures may be configured with continuously varying optical powers, e.g., by selecting voltages applied to the transparent conductors of the LC Fresnel structures resulting in a desired phase profile.

In some examples, a Fresnel structure can be polarization insensitive, for example, by combining one Fresnel structure providing optical power for a first polarization of light with another Fresnel structure providing optical power for a second polarization of light, where the second polarization of light is orthogonal to the first polarization of light.

Display device 500 is coupled to one or more processors 560. Processor(s) 560 is configured to control light emission device array 510 to display images and configured to control varifocal optical system 530 to set a focal length of varifocal optical system 530. Processor(s) 560 may represent any of the processors described herein, including processors 302 and 312 shown in FIGS. 3 and 4. Processor(s) 560 may include application-specific or other control circuitry, processing cores for executing instructions, discrete logic, or other hardware elements.

As described above, a varifocal optical assembly may include an astigmatism compensation assembly and, optionally, at least one spherically lensing module. The at least one spherically lensing module may include, for example, one or more Fresnel zone plate lenses, one or more diffractive Fresnel lenses having significant diffraction, or one or more refractive Fresnel lenses having diffraction effects are minimized, or combinations thereof. FIG. 6 illustrates the operation of an example spherically lensing optical module 600, which may be part of optical assembly 530 of FIG. 5 or be part of optical system(s) 205 in FIGS. 2A-4.

Figure 6A:
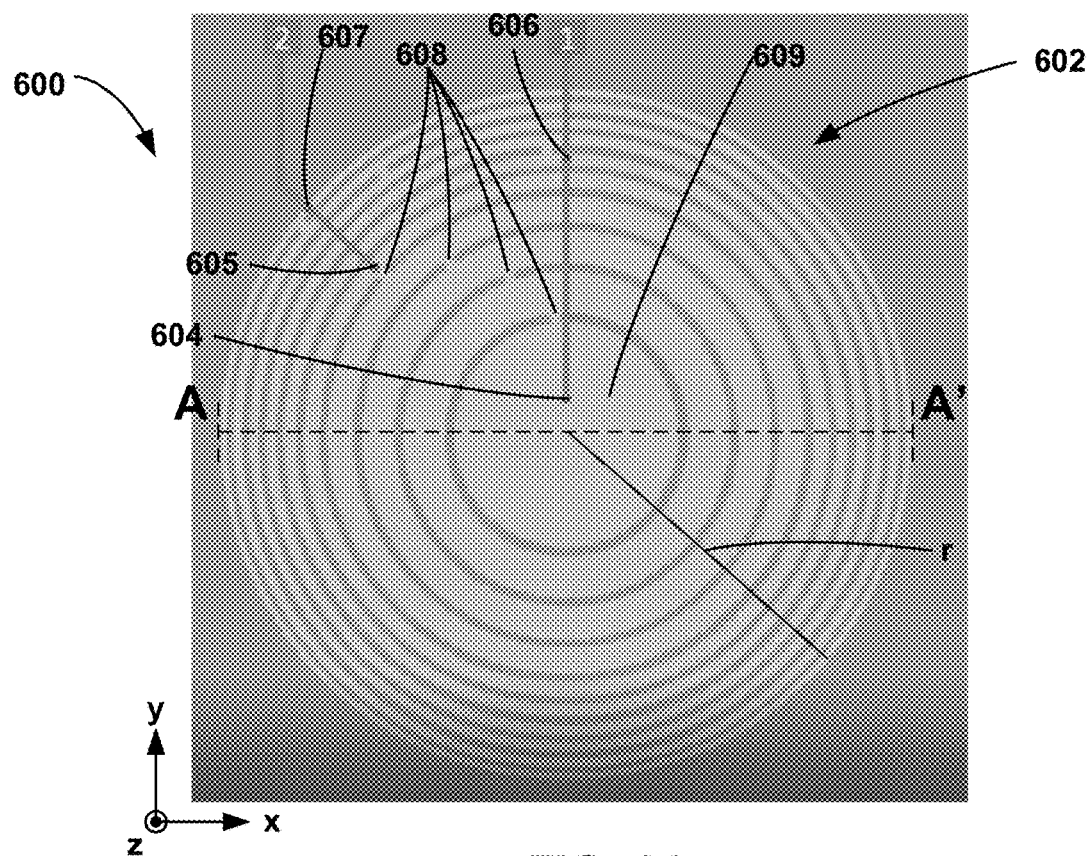
FIG. 6A is a schematic diagram of an example electrode pattern of a spherically lensing optical module, in accordance with the techniques described in this disclosure.

As shown in FIG. 6A, the spherically lensing optical module 600 includes an electrode pattern including a set of concentric conductors 602 configured to generate a voltage distribution within the liquid crystal layer that results in the liquid crystal layer exhibiting spherical focal power. In some examples, the spherically lensing optical module 600 includes a segmented phase profile LC lens, or SPP LC lens 600.

As shown in FIG. 6A, the set of concentric conductors 602 of the SPP LC lens 600 corresponds to a phase delay profile including plurality of concentric ring-shaped zones of increasing radii, which are referred to as Fresnel segments or Fresnel resets. For a positive thin lens, optical path difference ("OPD") is approximated with Maclaurin series to a parabolic profile as shown in Equation (1)

$$OPD(r) = \frac{-r^2}{2f}, \quad (1)$$

where r is the lens radius (i.e., half of the lens aperture) and f is the focal length. The OPD of an LC lens is proportional to the cell thickness d and the birefringence Δn of the LC material as shown in Equation (2)

$$OPD = d * \Delta n, \quad (2)$$

The response time τ of an Electrically Controlled Birefringence (ECB) LC cell, which is the time the material requires to recover to its original state, is quadratically dependent on cell thickness d ($\tau \propto d^2$) as shown in Equation (3)

$$\tau = \frac{\gamma \times d^2}{K_{11} \times \pi^2}, \quad (3)$$

where γ and $K_{11}$ are the rotational viscosity and the splay elastic constant of the LC material, respectively. Equations (1)-(3) show there is a tradeoff between the aperture size and response time, and thus designing an LC lens with large aperture and reasonable response time is difficult. In the disclosed examples, by introducing phase resets in the parabolic phase profile, e.g., using a SPP LC lens, a large aperture size of the LC lens may be allowed without compromising the response time.

Figure 6B:
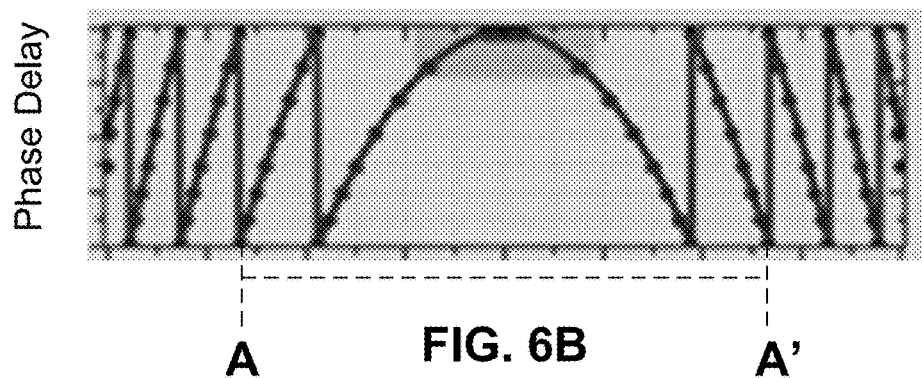
FIG. 6B is a schematic diagram of an example radial cross-section of the phase delay of a positive spherically lensing optical module, in accordance with the techniques described in this disclosure.

To decrease the effective thickness of the LC cell, resets or segments may be introduced into the lens phase profile. FIG. 6B illustrates a 2D phase map 610 of the SPP LC lens 600 having positive focal power, e.g. a converging lens, that includes 4 resets, where the thickness of the LC cell would be reduced up to 4 times and, accordingly, the response time would be improved by a factor of 16. That is, through introducing the segments in the lens phase profile, the optical power of SPP LC lens 600 may be adjusted sufficiently fast to keep pace with eye accommodation (e.g., accommodation occurs in around 300 ms), such that the vergence-accommodation conflict would be resolved. The 2D phase map 610 is an example cross-section of the spatial phase delay profile of SPP LC lens 600 along the line A-A' as illustrated in FIG. 6A. For clarity in the figure, only two of the resets are shown along A-A' in FIG. 6A. The Phase Delay axis of the plot shown in FIG. 6B represents the number of waves of phase delay at a particular position along the line A-A' for a particular design wavelength, e.g. 543.5 nm.

The number of the resets may be determined based on specific configurations of the Fresnel structure and SPP LC lens 600 requirements, such as the desired optical power, lens aperture, switching time, image quality of the LC lens. A large number of phase steps within one wavelength of OPD (i.e., per wavelength) may be desired for accurate representation of the desired phase profile. Meanwhile, to configure SPP LC lens 600 with a negligible diffraction angle for near eye applications, the minimum width of the Fresnel segments (i.e., the minimum Fresnel segment width) of the SPP LC lens 600 is desired to be larger than about 1 mm for green light having a wavelength of 543.5 nm.

Figure 6C:
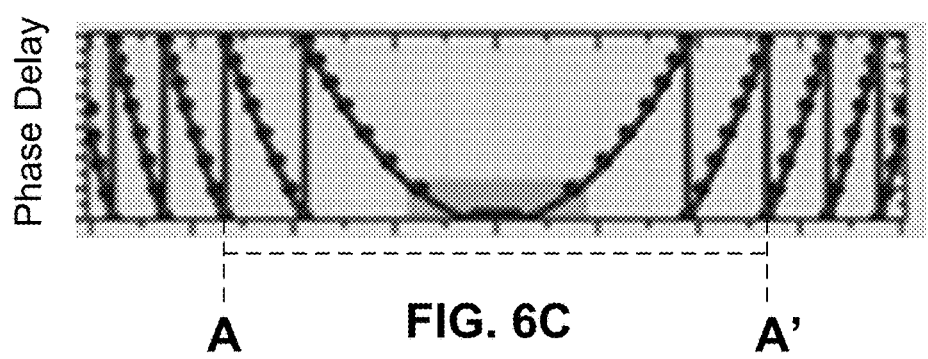
FIG. 6C is a schematic diagram of an example radial cross-section of the phase delay of a negative spherically lensing optical module, in accordance with the techniques described in this disclosure.

FIG. 6C illustrates a 2D phase map 620 of SPP LC lens 600 having negative focal power, e.g. a diverging lens, that includes 4 resets, where the thickness of the LC cell would be reduced up to 4 times and, accordingly, the response time would be improved by a factor of 16. As with FIG. 6B, 2D phase map 620 illustrated in FIG. 6C is an example cross-section of the spatial phase delay profile of SPP LC lens 600 along the line A-A' as illustrated in FIG. 6A. In some examples, SPP LC lens 600 having a 2D phase map 610 corresponding to a positive lens includes an LC material having a positive dielectric anisotropy, and SPP LC lens 600 having a 2D phase map 620 corresponding to a negative lens includes an LC material having a negative dielectric anisotropy.

Referring back to FIG. 6A, each reset can include a plurality of conductors, and each conductor may have a particular voltage applied to it. Application of varying voltages, e.g. a voltage profile, across the plurality of conductors within a reset controls the alignment of the liquid crystals across the area covered by the reset, e.g. the segment, and therefore the phase delay profile across the segment. The example illustrated in FIG. 6A includes two resets, each having five conductors. In some examples, each conductor of each reset can be addressed individually, e.g. a voltage can be applied to each individual conductor independently of all the other conductors. In other examples, a single voltage is applied to the plurality of conductors within a reset. For example, the set of conductors within a reset can be electrically connected in series, with a first conductor connected to the positive terminal of a voltage source and a last conductor connected to the negative terminal of the voltage source (or vice versa). In the example shown in FIG.

6A, a first wire "1" is connected to the positive terminal of a voltage source can be connected to the central conductor 609 at the terminal 604. Each of the next four concentric conductors adjacent to the central conductor 609 can be connected in series, e.g. at the connections 608, with a particular resistance between each of the concentric conductors. The resistances at the connections 608 may be the same or may be different from each other. The resistances at the connections 608 may be selected to provide selected voltage drops across each of the connections 608 so as to result in selected voltages applied to each of the concentric conductors in each reset. For example, the resistances at the connections 608 may all be the same and result in a linear step-down in voltages applied to successive conductors connected in series by the connections 608 in a reset, e.g. a linear voltage profile across the reset. In other examples, the resistances at the connections 608 can be different and result in a non-linear voltage profile across the reset. In some examples, the resistance can be the sheet resistance of the conductor itself. In the example shown, there is no electrical connection 608 between the "last" concentric conductor of the first reset and the "first" concentric conductor of the second reset. In some examples, the resistance between each of the conductors of a reset are the same, resulting in a linear voltage profile across the reset. In the example shown, a second wire "2" is connected to the negative terminal of the voltage source and is also connected to the outermost concentric conductor of the reset at the terminal 605. In some examples, the same voltage profile, resulting in the same phase profile, can be applied to each reset via only two wires. For example, FIG. 6A illustrates the first wire 1 also connected to first conductor of the second reset at the terminal 606 and the second wire 2 connected to the last conductor in the series of conductors of the second reset at the terminal 607, each of the conductors of the second reset being connected in series at connections points similar to those of the first reset (not labeled in FIG. 6A for clarity). In the example shown, the spatial profile of the conductors varies as the square of the distance from the center of the lens, e.g. the conductors follow a parabolic spatial profile. For a linear voltage profile across the resets, and if the phase delay response versus the voltage applied across the liquid crystal material is linear (e.g. a "linear LC response"), the spatial profile of the phase delay will follow the spatial profile of the conductors, resulting in a parabolic phase delay profile like that illustrated in FIGS. 6B and 6C. In some examples, the response of the LC material is not linear, as discussed below with respect to FIG. 9.

The at least one astigmatism compensation assembly may include, for example, one or more Fresnel zone plate lenses, one or more diffractive Fresnel lenses having significant diffraction, or one or more refractive Fresnel lenses having diffraction effects are minimized, or combinations thereof. FIG. 7 illustrates the operation of an example cylindrically lensing optical module 700, which may be used as an astigmatism compensation assembly and which may be part of optical assembly 530 of FIG. 5 or be part of optical system(s) 205 in FIGS. 2A-4.

Figure 7A:
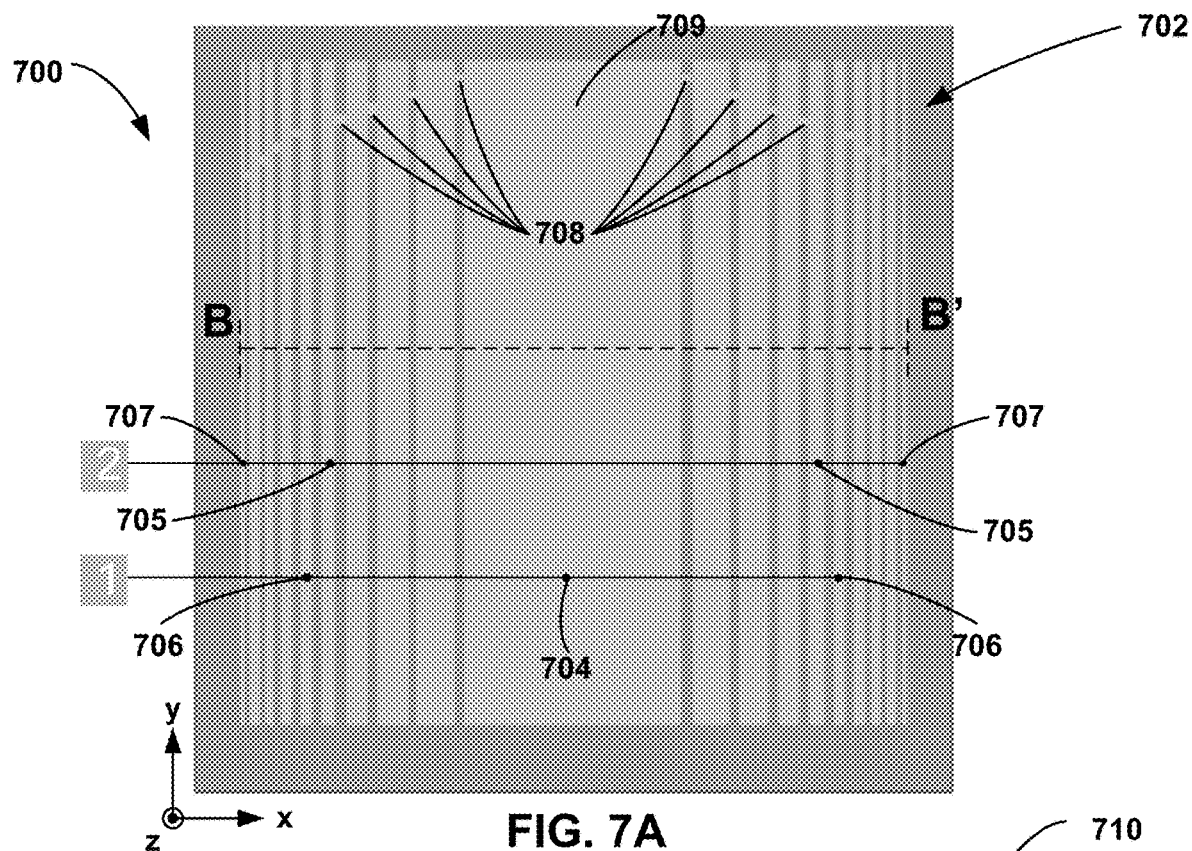
FIG. 7A is a schematic diagram of an example electrode pattern of a cylindrically lensing optical module, in accordance with the techniques described in this disclosure.

As shown in FIG. 7A, cylindrically lensing optical module 700 includes an electrode pattern including a set of linear and parallel conductors 702 configured to generate a voltage distribution within the liquid crystal layer that results in the liquid crystal layer exhibiting cylindrical focal power. In some examples, cylindrically lensing optical module 700 includes a segmented phase profile LC lens, or SPP LC lens 700.

Similar to the spherically lensing optical module 600 illustrated in FIG. 6A (e.g. the SPP LC lens 600), the cylindrically lensing optical module 700 illustrated in FIG. 7A (e.g. the SPP LC lens 700) includes an electrode pattern including a set of linear and parallel conductors 702 having widths that vary across one of the dimensions of the lens, e.g. the x-dimension as illustrated, and is configured to generate a voltage distribution within the liquid crystal layer that results in the liquid crystal layer exhibiting cylindrical focal power. In some examples, the cylindrically lensing optical module 700 includes a segmented phase profile LC lens, or SPP LC lens 700.

As shown in FIG. 7A, the set of linear and parallel conductors 702 of the SPP LC lens 700 corresponds to a phase delay profile including a plurality of linear and parallel zones of varying widths, which are referred to as Fresnel segments or Fresnel resets. In the example, shown, the SPP LC lens 700 includes two zones/resets. As with SPP LC lens 600, Equations (1)-(3) apply to SPP LC lens 700 and by introducing phase resets in the parabolic phase profile, a large aperture size of the LC lens may be allowed without compromising the response time.

Figure 7B:
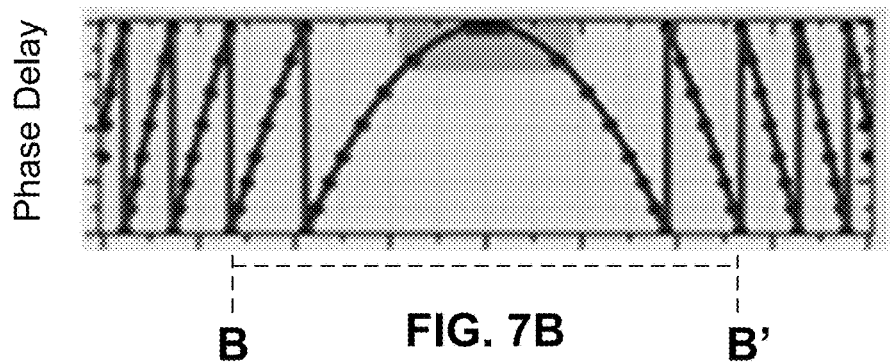
FIG. 7B is a schematic diagram of an example cross-section of the phase delay of a positive cylindrically lensing optical module, in accordance with the techniques described in this disclosure.

FIG. 7B illustrates 2D phase map 710 of an example SPP LC lens 700 having positive cylinder focal power, e.g. a cylindrically converging lens, that includes 4 resets, where the thickness of the LC cell would be reduced up to 4 times and, accordingly, the response time would be improved by a factor of 16. That is, through introducing the segments in the lens phase profile, the optical power of SPP LC lens 700 may be adjusted sufficiently fast to keep pace with eye accommodation (e.g., accommodation occurs in around 300 ms), such that the vergence-accommodation conflict would be improved or substantially resolved. 2D phase map 710 is an example cross-section of the spatial phase delay profile of SPP LC lens 700 along the line B-B' as illustrated in FIG. 7A. For clarity in the figure, only two of the resets are shown along B-B' in FIG. 7A. The Phase Delay axis of the plot shown in FIG. 7B represents the number of waves of phase delay at a particular position along the line B-B' for a particular design wavelength, e.g. 543.5 nm.

As described above relative to FIG. 6B, the number of the resets may be determined based on specific configurations of the Fresnel structure and the SPP LC lens 700 requirements, such as the desired optical power, lens aperture, switching time, image quality of the LC lens, or the like. A large number of phase steps within one wavelength of OPD (i.e., per wavelength) may be desired for accurate representation of the desired phase profile. Meanwhile, to configure the SPP LC lens with negligible diffraction angle for near eye applications, the minimum width of the Fresnel segments (i.e., the minimum Fresnel segment width) of SPP LC lens 700 is desired to be larger than about 1 mm for green light having a wavelength of 543.5 nm.

Figure 7C:
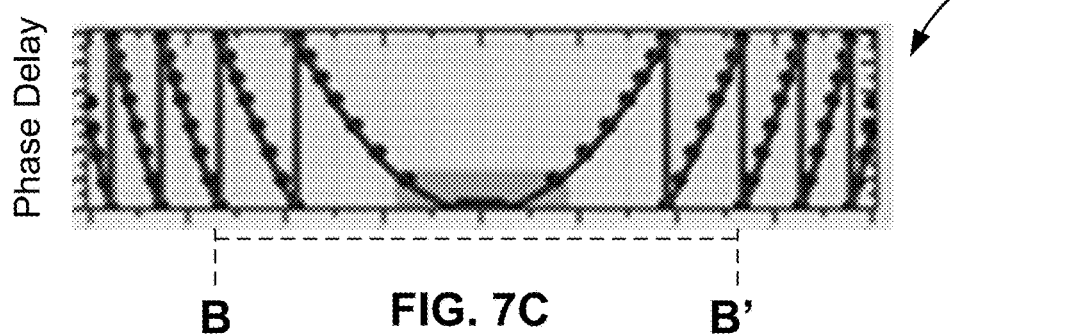
FIG. 7C is a schematic diagram of an example cross-section of the phase delay of a negative cylindrically lensing optical module, in accordance with the techniques described in this disclosure.

FIG. 7C illustrates 2D phase map 720 of an example of SPP LC lens 700 having negative cylinder focal power, e.g. a diverging cylindrical lens, that includes 4 resets, where the thickness of the LC cell would be reduced up to 4 times and, accordingly, the response time would be improved by a factor of 16. As with FIG. 7B, 2D phase map 720 illustrated in FIG. 7C is an example cross-section of the spatial phase delay profile of SPP LC lens 700 along the line B-B' as illustrated in FIG. 7A. In some examples, the SPP LC lens 700 having a 2D phase map 710 corresponding to a positive lens includes an LC material having a positive dielectric anisotropy, and the SPP LC lens 700 having a 2D phase map 720 corresponding to a negative lens includes an LC material having a negative dielectric anisotropy.

Referring back to FIG. 7A, each reset can include a plurality of conductors, each having an applied voltage. As described above, application of varying voltages, e.g. a voltage profile, across the plurality of conductors within a reset controls the alignment of the liquid crystals across the area of the LC cell covered by the reset, e.g. the segment, and therefore the phase delay profile across the segment. The example illustrated in FIG. 7A includes two resets, each having nine linear conductors positioned in parallel along the y-axis and following a parabolic spatial pattern having symmetry about the center of central conductor 709 along the x-axis. In some examples, each conductor of each reset can be addressed individually, e.g. a voltage can be applied to each individual conductor independently of all the other conductors. In other examples, a single voltage is applied to the plurality of conductors within a reset. For example, the set of conductors within a reset can be electrically connected in series, with a first conductor(s) connected to the positive terminal of a voltage source and the symmetric pair of last conductors connected to the negative terminal of the voltage source (or vice versa). In the example shown in FIG. 7A, a first wire "1" is connected to the positive terminal of a voltage source can be connected to the central conductor 709 at the terminal 704. Each of the next four parallel conductors adjacent to the central conductor 709 in the negative x-direction (e.g. to the "left") can be connected in series, e.g. at the connections 708, with a particular resistance between each of the parallel conductors. Similarly, each of the next four parallel conductors adjacent to the central conductor 709 in the positive x-direction (e.g. to the "right") can be connected in series, e.g. at the connections 708, with a particular resistance between each of the parallel conductors. The resistances at the connections 708 may be the same or may be different from each other. The resistances at the connections 708 may be selected to provide selected voltage drops across each of the connections 708 so as to result in selected voltages applied to each of the parallel conductors in each reset. For example, the resistances at the connections 708 may all be the same and result in a linear step-down in voltages applied to successive conductors connected in series by the connections 708 in a reset, e.g. a linear voltage profile across the reset. In other examples, the resistances at the connections 708 can be different and result in a non-linear voltage profile across the reset. In some examples, the resistance can be the sheet resistance of the conductor itself. In the example shown, there is no electrical connection 708 between the "last" conductors of the first reset and the "first" conductors of the second reset. In some examples, the resistance between each of the conductors of a reset are the same, resulting in a linear voltage profile across the reset. In the example shown, a second wire "2" is connected to the negative terminal of the voltage source and is also connected to the outermost parallel conductors of the reset at the terminals 705 in both the positive and negative x-directions. In some examples, the same voltage profile, resulting in the same phase profile, can be applied to each reset via only two wires. For example, FIG. 7A illustrates the first wire 1 also connected to the "first" conductors of the second reset at the terminals 706 in both the positive and negative x-directions from the center of the central conductor 709, and the second wire 2 connected to the last conductors in the series of conductors of the second reset at the terminals 707, each of the conductors of the second reset being connected in series at connections points similar to those of the first reset (not labeled in FIG. 7A for clarity). In the example shown, the spatial profile of the conductors varies as the square of the distance from the center of the lens along the x-axis, e.g. the conductors follow a parabolic spatial profile. For a linear voltage profile across the resets, and if the phase delay response versus the voltage applied across the liquid crystal material is linear (e.g. a "liner LC response), the spatial profile of the phase delay will follow the spatial profile of the conductors, resulting in a parabolic phase delay profile like that illustrated in FIGS. 7B and 7C. In some examples, the response of the LC material is not linear, as discussed below with respect to FIG. 9.

Figure 8:
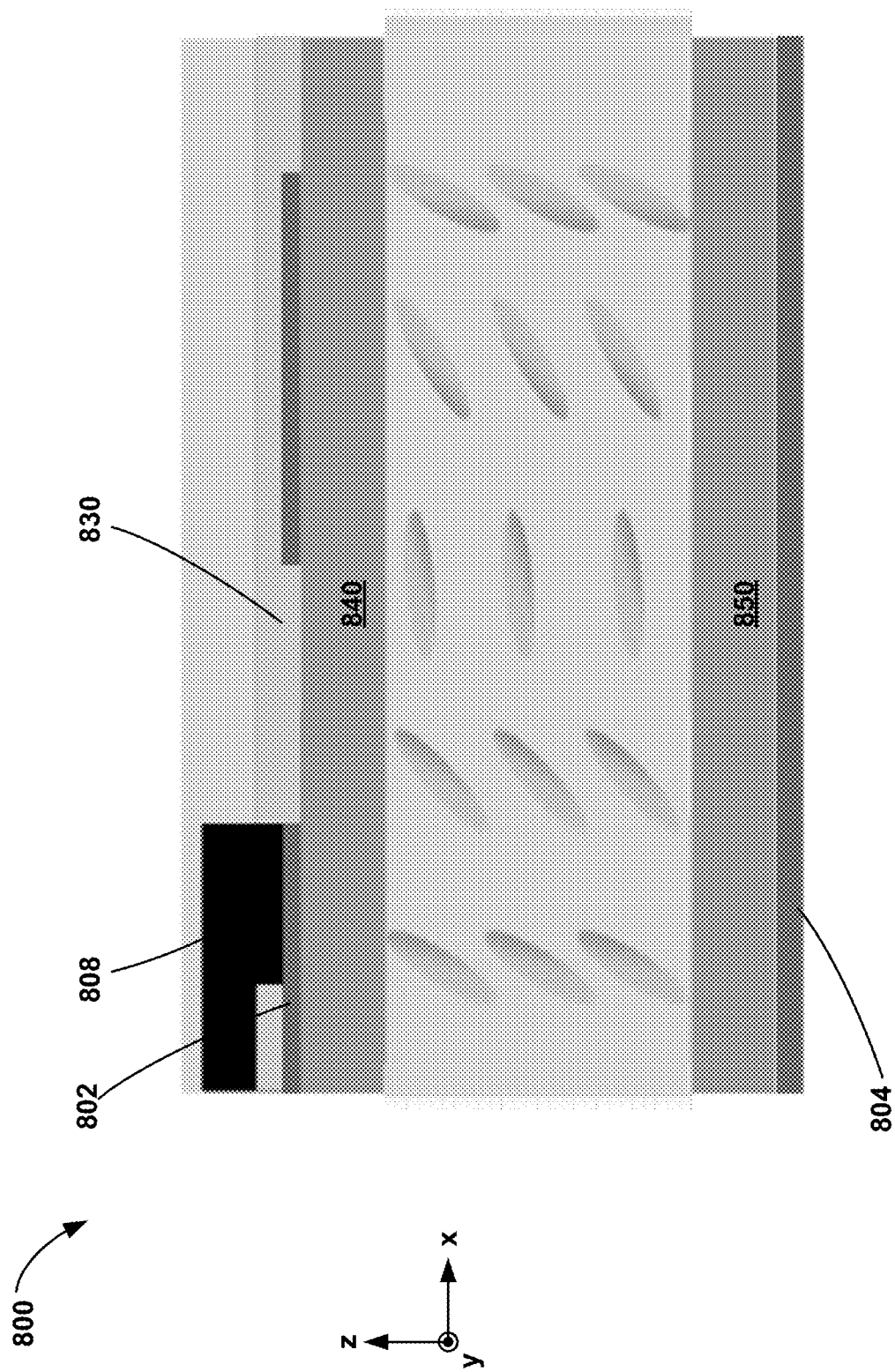
FIG. 8 is a schematic diagram of a cross-section of a portion of an example liquid crystal lens including an example conductor connection, in accordance with the techniques described in this disclosure.

FIG. 8 is a schematic diagram of a cross-section of a portion of an example liquid crystal lens 800 including an example conductor connection 808, in accordance with the techniques described in this disclosure. FIG. 8 illustrates the substrate of a LC lens including the conductor pattern, such as the conductor patterns 602, 702. In the example shown, the LC lens 800 includes conductors 802, a dielectric material 830, substrates 840 and 850, conductor 804, and conductor connection 808.

In some examples, a conductor pattern is constructed on a substrate of an LC lens. An electrically insulating dielectric material 830 is deposited over the conductors, for example, a layer of SiO2. Next, regions of the dielectric material are removed over selected conductors 802 in the pattern, leaving holes or "vias." Another conductive material is deposited over the dielectric material 830, filling in the vias and in electrical contact with the conductors 802. Undesired or unnecessary portions of the conductive material are removed, leaving conductor connections 808 in electrical contact with one or more of the conductors 802 of the LC lens conductor pattern by way of one or more vias in the dielectric material 830. In some examples, the conductor connections 808 are conductors that are substantially transparent to wavelengths at which the LC lens is designed to operate, e.g. indium-tin oxide (ITO) or nickel. In some examples, the conductor connections 808 are formed having a certain electrical resistance, for example, dopants or other materials can be added to change the resistance of the material of the conductor connections 808, and in some examples the resistance of the conductor connections 808 can be proportional to the size of the conductor connection 808, e.g. its width, length, and thickness. In some examples, the positioning of the conductor connections 808 can be staggered, for example, as illustrated in FIGS. 6A and 7A.

In some examples, substrates 840 and 850 may be glass substrates. In some examples, conductor 804 may be a ground plane conductor and may be made of the same conductive material as conductors 802, or may be made of different conductive material than conductors 802.

Figure 9:
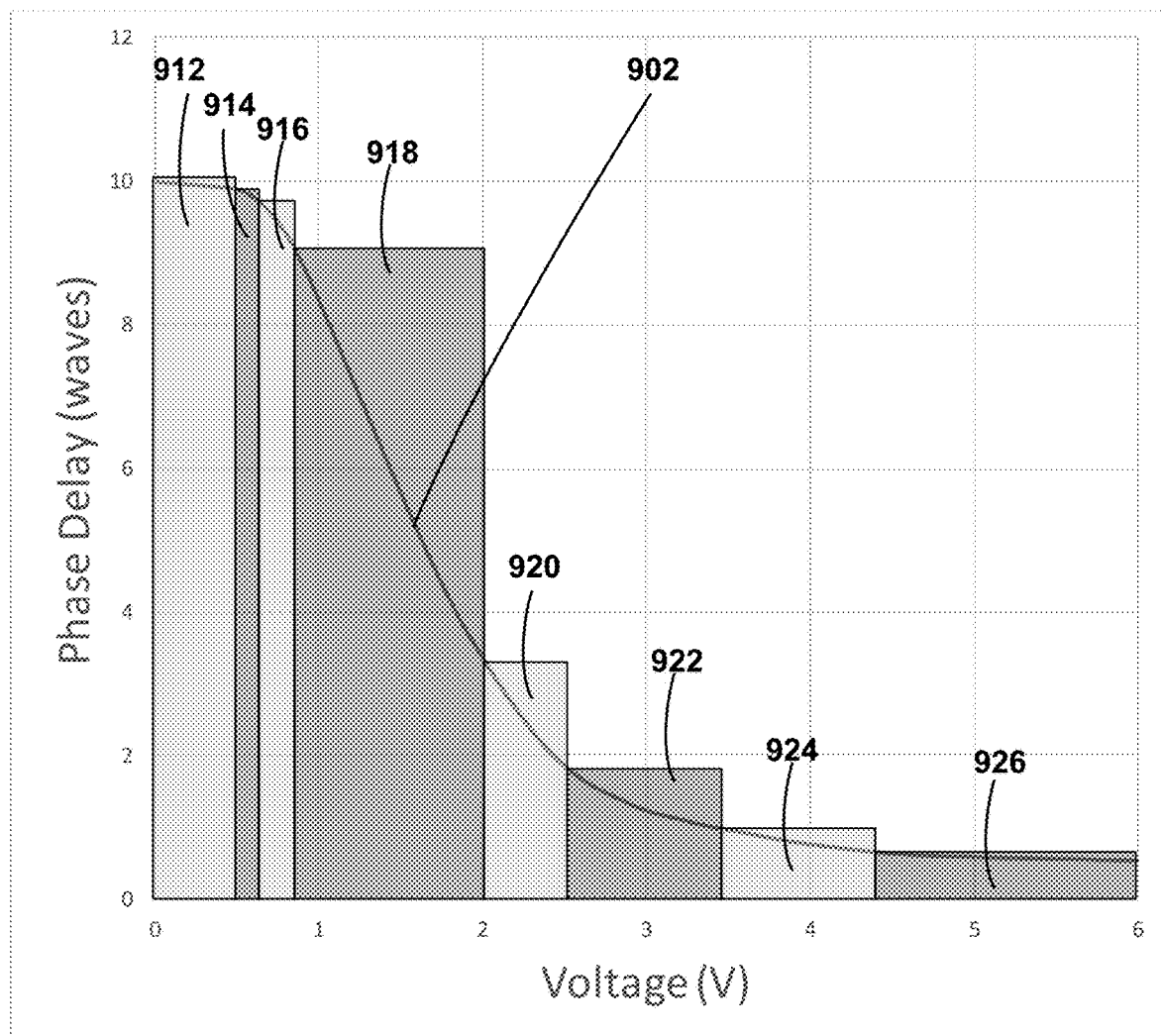
FIG. 9 is a plot of an example phase delay of a liquid crystal optical module as a function of voltage applied to electrodes of the module, in accordance with the techniques described in this disclosure.

FIG. 9 is a plot of an example phase delay of a SPP LC lens as a function of voltage applied to electrodes of the module, in accordance with the techniques described in this disclosure.

In the examples shown, the phase delay response 802 of the liquid crystal material of the SPP LC lens is non-linear. In order to control an SPP LC lens, such as the SPP LC lens 600 or the SPP LC lens 700, to have a desired spatial phase delay profile, such as the parabolic phase delay profile illustrated in FIGS. 6B-6C and 7B-7C, either the spatial patterning of the conductors 602, 702 or the voltage applied to the conductors 602, 702 need to account for the non-linear phase response to voltage of the LC material. For example, for a conductor pattern 602, 702 having each conductor connected in series and having a constant resistance between each conductor, only 2 wires connecting the conductors of the conductor pattern, e.g. connecting a positive terminal electrically connected to the central conductor and a negative terminal connected to a perimeter conductor, would be needed if the phase delay response of the LC material were linear. Such a conductor pattern as connected would result in a linear voltage profile. As such, for a conductor pattern having a parabolically varying spatial pattern, such as the conductors 602, 702 illustrated in FIG. 6A or 7A, the phase profile would similarly be spatially parabolic. However, if the phase delay response of the LC material is not linear, significantly more control over the individual conductors of the SPP LC lens may be necessary.

In some examples, more wires can be included to control the phase delay profile of the SPP LC lens, for example, an SPP LC lens having a non-linear phase response 902 as illustrated. As such, the set of conductors comprising a reset can be further sub-segmented and electrically disconnected from each other, while each of the conductors within each sub-segment can be connected in series and a linear voltage profile can be applied to each sub-segment independent of each of the other sub-segments via pairs of wires connected to the positive and negative terminals of a voltage source (e.g. and independently controlled via timing), or a plurality of voltage sources. As such, the non-linear LC phase response profile 902 can be approximated by a plurality of segments, each having a linear phase response versus voltage. In the example shown, the LC phase response profile 902 includes eight linear phase response segments 912-926, each of which can have a plurality of conductors connected in series. For example, an SPP LC lens can have many conductors included in each reset, e.g. 64 conductors, 256 conductors, 1024 conductors or more, and have many resets. Approximating the non-linear LC phase response with linear segments has the benefit of significantly reducing the number of connections between the voltage source or sources and the conductors and the complexity of addressing the conductors. For example, for an SPP LC lens having 4 resets, each having 72 electrodes, sub-segmenting the conductors into four linear phase response segments requires only eight wires, representing a significant reduction in the connections and complexity required in individually addressing all 288 conductors. In some examples, the number of conductors included in each of the sub-segments is the same, and in other examples, the number conductors included in each of the sub-segments can be different.

Figure 10A:
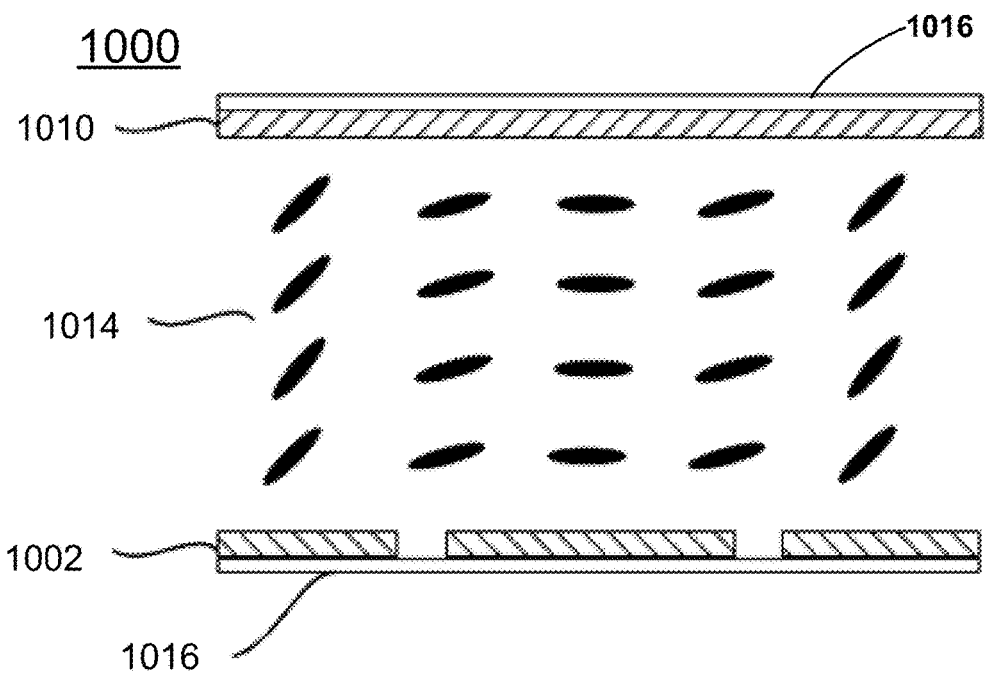
FIG. 10A illustrates a schematic diagram of a segmented phase profile liquid crystal lens (SPP LC lens), in accordance with the techniques described in this disclosure.

FIG. 10A illustrates a schematic diagram of an SPP LC lens 1000, in accordance with the techniques described in this disclosure. The SPP LC lens 1000 may be part of optical assembly 530 of FIG. 5 or be part of optical system(s) 205 in FIGS. 2A-4. As shown in FIG. 10A, the SPP LC lens 1000 may include a plurality of first electrodes 1002, one or more second electrode 1010, a liquid crystal (LC) layer 1014, and substrates 1016. The substrates 1016 may be substantially transparent in the visible band (~380 nm to 750 nm). In certain embodiments, the substrates 1016 may also be transparent in some or all of the infrared (IR) band (~750 nm to 1 mm). The substrate layers may be composed of, e.g., $SiO_2$, plastic, sapphire, etc. The first electrodes 1002 and second electrodes 1010 may be transparent electrodes (e.g., indium tin oxide electrodes) disposed on the substrates 1016 and configured to generate electric fields, which reorients the LC molecules in the LC layer 1014 to form a lens having a desired phase profile.

In some examples, the first electrodes 1002 may include discrete ring-shaped electrodes corresponding to the Fresnel structures in the spherically lensing optical module 600, and the ring-shaped electrodes may be concentric with identical area. With this electrode geometry, when the phase difference between adjacent first electrodes 1002 is the same, a parabolic phase profile may be obtained. If the phase is proportional to the applied voltage, a linear change in the voltage across the first electrodes 1002 (same difference in voltage between any two first electrodes 412) may yield a desired parabolic phase profile, as discussed above with respect to FIG. 9.

In some examples, the first electrodes 1002 may include linear and parallel electrodes corresponding to the Fresnel structures in the cylindrically lensing optical module 700. With this electrode geometry, when the phase difference between adjacent first electrodes 1002 is the same, a parabolic phase profile in the direction perpendicular to the linear and parallel electrodes may be obtained. If the phase is proportional to the applied voltage, a linear change in the voltage across the first electrodes 1002 (same difference in voltage between any two first electrodes 412) may yield a desired parabolic phase profile, as discussed above with respect to FIG. 9

Figure 10B:
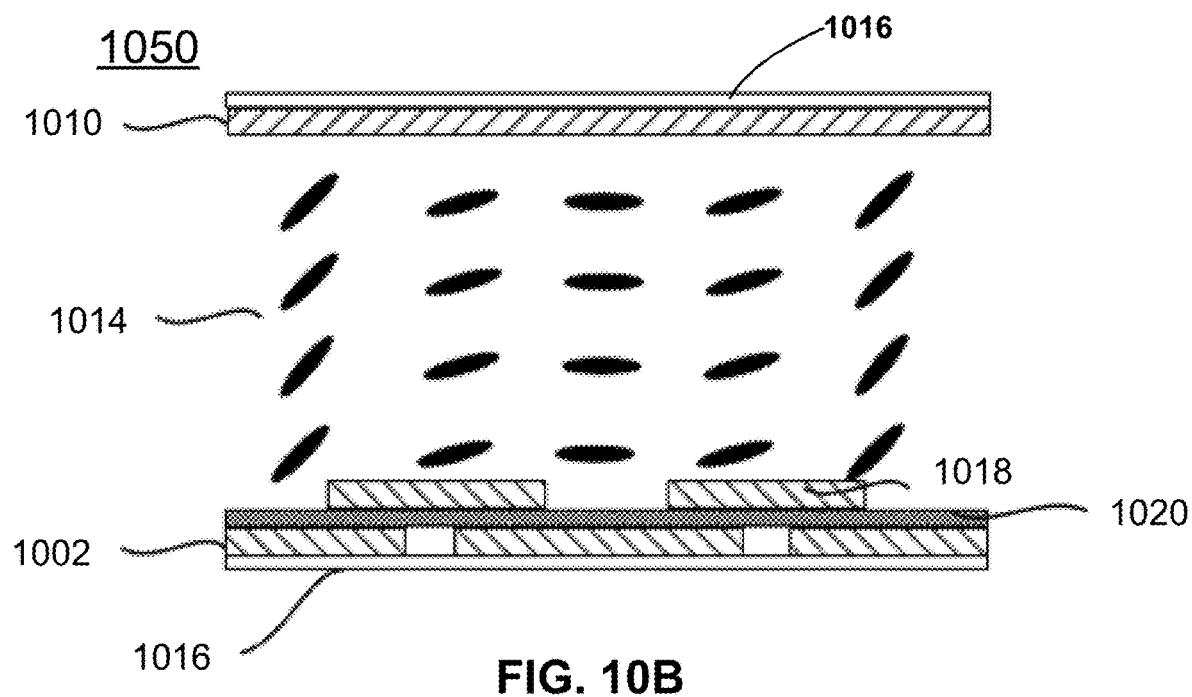
FIG. 10B illustrates a schematic diagram of an SPP LC lens having floating electrodes, in accordance with the techniques described in this disclosure.

In some examples, the gaps between the first electrodes 1002 can cause scattering and thus image degradation. To address that image degradation, a plurality of floating electrodes may be introduced. FIG. 10B illustrates a schematic diagram of an SPP LC lens 1050 having floating electrode, in accordance with the techniques described in this disclosure. As shown in FIG. 10B, a plurality of floating electrodes 1018 may be disposed on the substrate 1016 having the first electrodes 1002. The floating electrodes 1018 may include discrete and concentric ring electrodes which are not driven by ohmic connection but are capacitively coupled to the first electrodes 1002. The floating electrodes 1018 may be configured to cover half of the area of each of neighboring first electrodes 1002. An insulating layer 1020 may be disposed between the floating electrodes 1018 and the first electrodes 1002 to achieve the electrical insulation.

Figure 11:
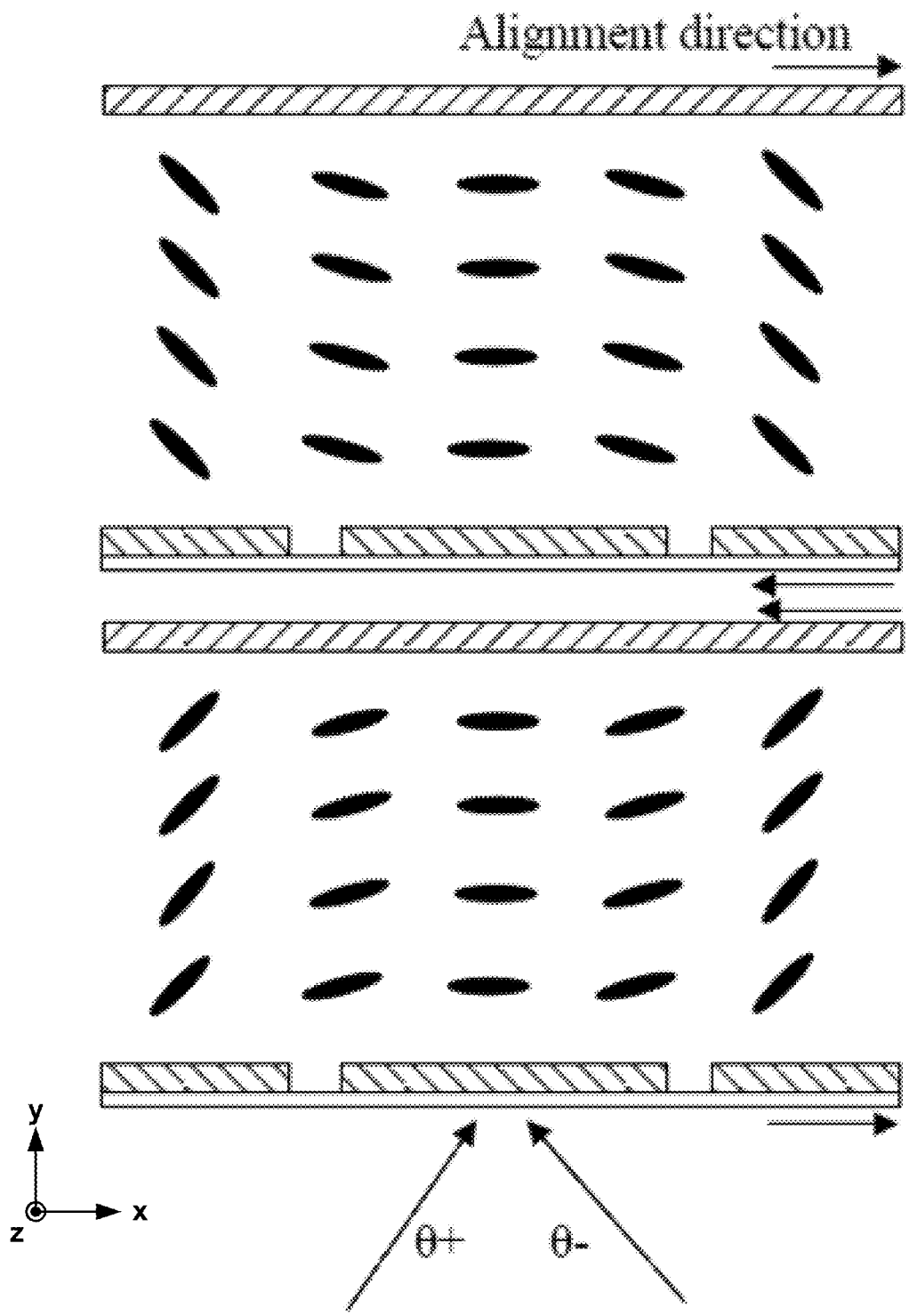
FIG. 11 illustrates a schematic diagram of an SPP LC lens stack, in accordance with the techniques described in this disclosure.

To further improve the response time of the SPP LC lens, in some examples, multiple SPP LC lenses (e.g., multiple lens layers) may be optically coupled to form a stack of SPP LC lens, i.e., an SPP LC lens stack, such that given a same tunable optical power range, the thickness of each SPP LC lens may be reduced and, accordingly, the response of each SPP LC lens may be reduced. FIG. 11 illustrates a schematic diagram of an SPP LC lens stack 110, in accordance with the techniques described in this disclosure. For illustrative purposes, FIG. 11 shows a pair of SPP LC lenses may be optically coupled to form the SPP LC lens stack 1100. Provided that each SPP LC lens has 5 resets in the phase profile, considering the effect of the pair of lenses and the Fresnel resets, the thickness of the LC cell may be reduced up to 10 times (5 resets×2) and, accordingly, the response speed may be improved by a factor of 100. Moreover, the two SPP LC lenses may have opposite alignment directions (e.g., rubbing directions) on the corresponding LC surfaces of the two SPP LC lens, so as to improve the viewing angle. That is, for viewing angle improvement, two of SPP LC lenses with the same configuration but opposite rubbing directions may be optically coupled.

In addition, polarization insensitivity is also very important for HMDs for AR applications. Most LC materials are birefringent and, thus, are polarization sensitive. When the light propagating in a direction parallel to the LC director is incident onto the LC cell, the light will experience ordinary refractive index n0 of the LC material for any polarization states. However, when the light propagating in a direction perpendicular to the LC director is incident onto the LC cell, the light will experience refractive index between the ordinary refractive index n0 and extraordinary refractive index ne of the LC material, depending on the polarization state of light.

Figure 12:
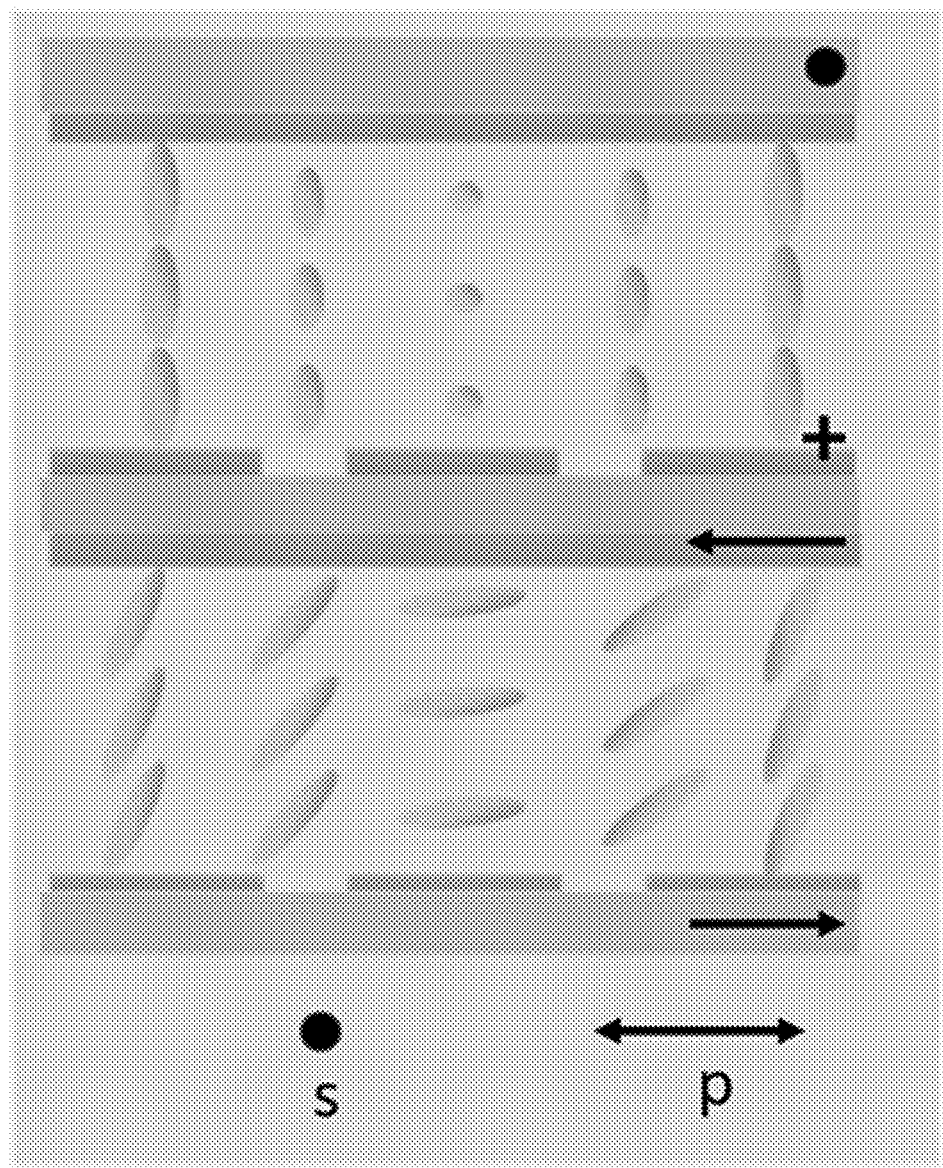
FIG. 12 is a schematic diagram illustrating a polarization insensitive SPP LC lens, in accordance with the techniques described in this disclosure.

Cholesteric LC materials can be made polarization insensitive as discussed by Clarke et al. in Electro-active lens U.S. Pat. No. 7,728,949B2. In this case, the pitch of cholesteric LCs can be made in the range of the wavelength of incident light and, therefore, when no voltage is applied to the LC cell, the light will experience an average refractive index $(n_o+n_e/2)$ for any polarization states of light. For nematic LCs, the SPP LC lenses may be configured to be polarization insensitive by optically coupling cells of orthogonal polarization, in which each cell may focus one polarization state of light, for example, one cell focuses s polarization and the other focuses p polarization. FIG. 12 is a schematic diagram illustrating a polarization insensitive SPP LC lens 1200 including optically coupled cells of orthogonal polarization in which each cell focuses one polarization state of light, in accordance with the techniques described in this disclosure.

Figure 13:
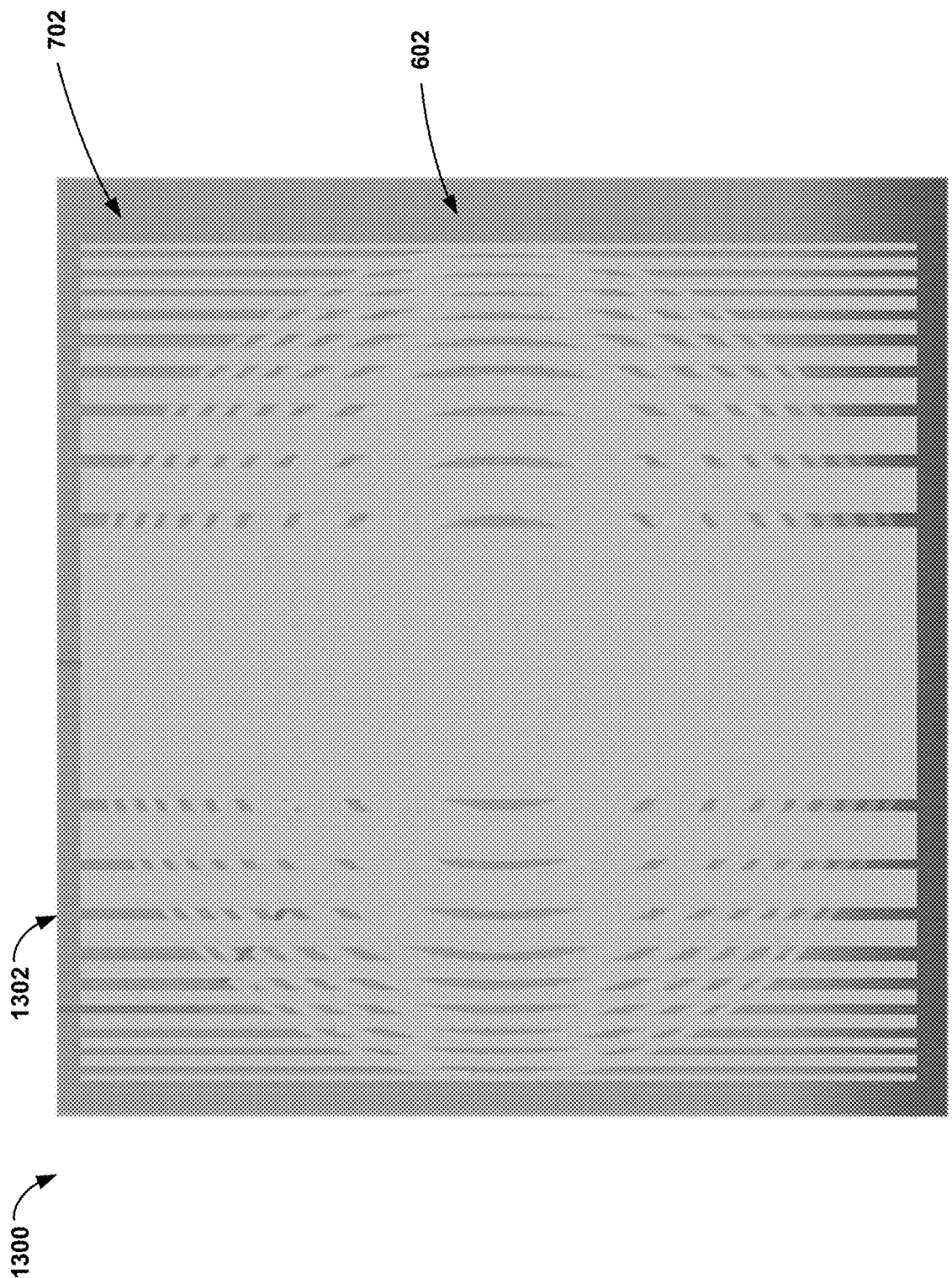
FIG. 13 is a schematic diagram illustrating an example electrode pattern of a spherically lensing optical module overlapped with an example electrode pattern of a cylindrically lensing optical module, in accordance with the techniques described in this disclosure.

FIG. 13 is a schematic diagram illustrating an example electrode pattern 1302 of a lensing optical module 1300 that provides astigmatism compensation, in accordance with the techniques described in this disclosure. The lensing optical module 1300 may be part of optical assembly 530 of FIG. 5 or be part of optical system(s) 205 in FIGS. 2A-4. In the example shown, the lensing optical module 1300 includes an electrode pattern 1302 which is a combination of the electrode pattern 602 of a spherically lensing optical module and the electrode pattern 702 of a cylindrically lensing optical module, such as those described above with respect to FIGS. 6-7.

As shown in FIG. 13, the lensing optical module 1300 includes an electrode pattern including a set of concentric conductors 602 configured to generate a voltage distribution within the liquid crystal layer that results in the liquid crystal layer exhibiting spherical focal power. In addition, the lensing optical module 1300 includes an electrode pattern including a set of linear and parallel conductors 702 configured to generate a voltage distribution within the liquid crystal layer that results in the liquid crystal layer exhibiting cylindrical focal power. In some examples, both spherical and cylindrical lensing can be generated by the conductors 602 and the conductors 702 using the same liquid crystal layer. For example, the conductors 602 can be patterned on a substrate of the lensing optical module 1300 in one layer, and the conductors 702 can be patterned on the substrate of the lensing optical module 1300 in another layer with a dielectric layer disposed between the conductors 602 and 702, for example the dielectric layer 830. In some examples, the liquid crystal layer can impart a sufficient phase delay, e.g. is thick enough with enough birefringence, to realize two superimposed phase profiles and achieve both spherical lensing and cylindrical lensing. In some examples, the lensing optical module 1300 includes a segmented phase profile LC lens, or SPP LC lens 1300.

Alternatively, in some examples, multiple SPP LC lenses (e.g., multiple lens layers) may be optically coupled to form a stack of SPP LC lens, i.e., an SPP LC lens stack, that may be optically coupled to form the SPP LC lens stack including a spherical lensing optical module and a cylindrical lensing optical module.

Figure 14:
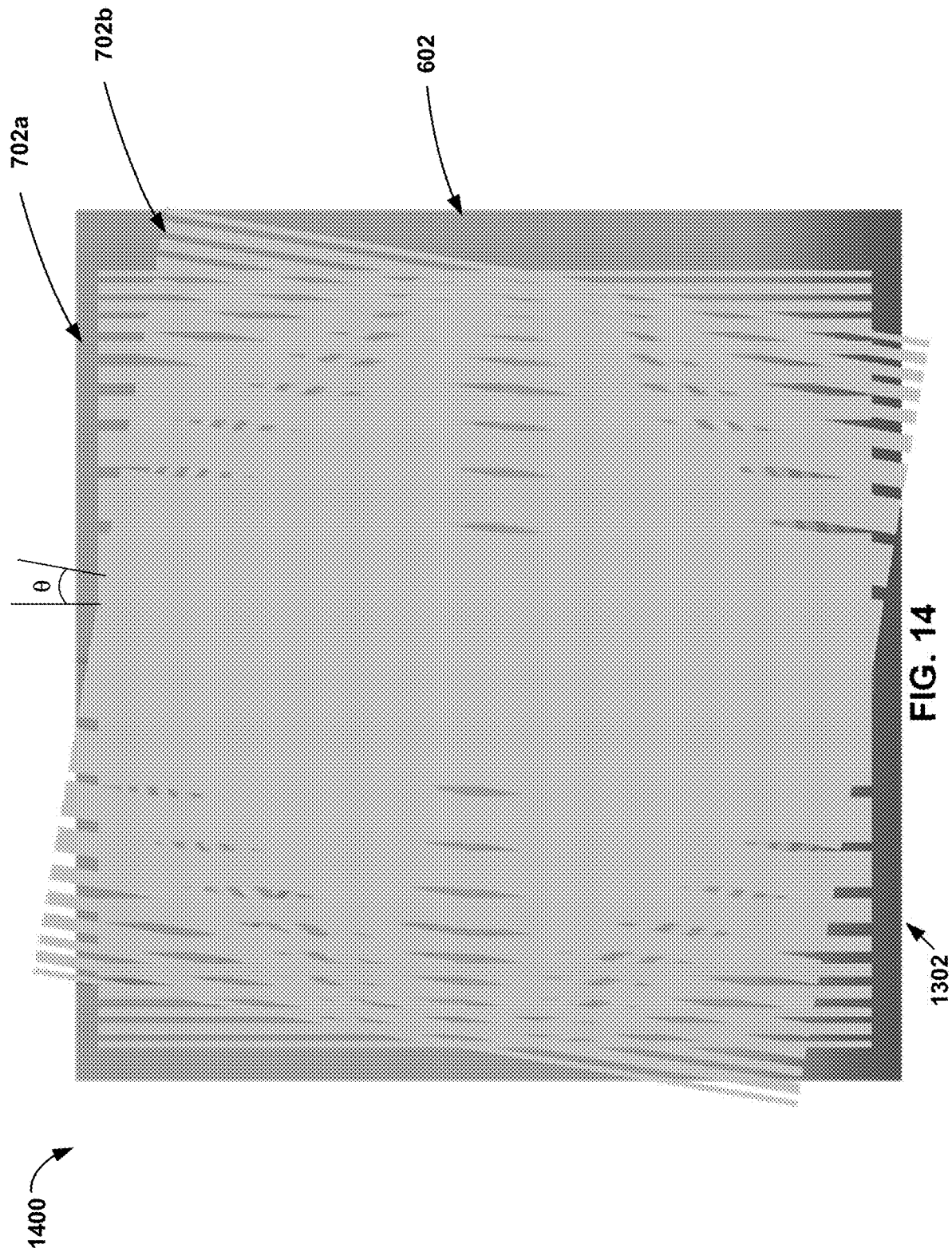
FIG. 14 is schematic diagram illustrating an example electrode pattern of a spherically lensing optical module overlapped with a plurality of example electrode patterns of cylindrically lensing optical modules, each of the cylindrically lensing optical modules rotated with respect to each other, in accordance with the techniques described in this disclosure.

FIG. 14 is a schematic diagram illustrating an example electrode pattern 1402 of a lensing optical module 1400 that provides astigmatism compensation, in accordance with the techniques described in this disclosure. The lensing optical module 1400 may be part of optical assembly 530 of FIG. 5 or be part of optical system(s) 205 in FIGS. 2A-4. In the example shown, the lensing optical module 1400 includes an electrode pattern 1402 which is a combination of the electrode pattern 602 of a spherically lensing optical module and the electrode pattern 702 of a cylindrically lensing optical module, such as those described above with respect to FIGS. 6-7.

As shown in FIG. 14, the lensing optical module 1400 is similar to the lensing optical module 1300 and includes multiple electrode patterns in different layers on a module including a single LC layer. In the example shown, the lensing optical module 1400 includes an electrode pattern including a set of concentric conductors 602 configured to generate a voltage distribution within the liquid crystal layer that results in the liquid crystal layer exhibiting spherical focal power. In addition, the lensing optical module 1400 includes an electrode pattern including a set of linear and parallel conductors 702a configured to generate a voltage distribution within the liquid crystal layer that results in the liquid crystal layer exhibiting cylindrical focal power, and also an electrode pattern including a set of linear and parallel conductors 702b, aligned at an azimuthal angle □ with respect to the linear and parallel conductors 702a, and configured to generate a voltage distribution within the liquid crystal layer that results in the liquid crystal layer exhibiting cylindrical focal power along an axis at the azimuthal angle □ with respect to the cylindrical lensing axis resulting from the conductors 702a. In some examples, any number of linear and parallel conductors 702n, disposed at regular or irregular azimuthal angles □, can be included in the lensing optical module 1400, each separated by a dielectric layer. For example, the lensing optical module 1400 can include a first layer having the concentric conductors 602, a dielectric layer, a second layer having the linear and parallel conductors 702a, a dielectric layer, a third layer having the linear and parallel conductors 702b aligned at an angle □ with respect to the conductors 702a, a dielectric layer, a fourth layer having linear and parallel conductors 702c aligned at an angle 2□ with respect to the conductors 702a, and repeating for any number of layers, each of which can include any conductor pattern. By way of illustrative example, the lensing module can include a layer having the concentric conductors 602, and 12 layers having linear and parallel conductors 702 aligned in 15 degree intervals thereby providing cylindrical focal power having vertical and oblique axes in the zero to 180 degree range in 15 degree intervals in addition to spherical focal power. For a particular user needing focal correction (myopic or hyperopic) and astigmatic correction, both the conductors 602 and the one of the plurality of linear and parallel conductors 702 having an axis most closely matching the axis of the users astigmatism can be selectively chosen. In some examples, the liquid crystal layer can impart a sufficient phase delay, e.g. is thick enough with enough birefringence, to realize any number of superimposed phase profiles and achieve any type of spherical, cylindrical, or any other lensing. In some examples, the lensing module 1400 can select any of the multiple conductor patterns 602, 702a-n.

Alternatively, in some examples, multiple SPP LC lenses (e.g., multiple lens layers) may be optically coupled to form a stack of SPP LC lens, i.e., an SPP LC lens stack, that may be optically coupled to form the SPP LC lens stack including a spherical lensing optical module and cylindrical lensing optical modules aligned along any vertical or oblique axis.

In some examples, an SPP LC lens, for example any of SPP LC lenses 600, 700, 1000, 1050, 1100, 1200, 1300, and 1400 described above, may include chromatic aberration correction. For example, chromatic aberration can be corrected using doublet lenses or other known techniques in optics.

Additionally, although the present description has primarily been described as addressing astigmatism of a user, the astigmatism compensation optical modules described herein may be used to compensate for optical aberrations introduced by other optical elements within an optical system in which astigmatism compensation optical modules are used.

The present disclosure is further directed to a method of providing a visual correction for an observer of a display. The method includes transmitting light through a varifocal optical assembly configured to provide astigmatism compensation comprising a of plurality of electrode patterns disposed on at least one substrate of a liquid crystal lens assembly. The plurality of electrode patterns each include a set of parallel conductors, and the plurality of electrode patterns are electrically isolated from each other by an insulator and rotated at an angle with respect to each other.

The method further includes determining an astigmatism correction axis, and adjusting the cylindrical focal power of the varifocal optical assembly configured to provide astigmatism compensation by changing the voltage applied to the conductors of the electrode pattern of the plurality of electrode patterns having conductors the most parallel to the astigmatism correction axis.

The method also may optionally include a spherical correction electrode pattern disposed on the at least one substrate of the liquid crystal lens assembly and electrically isolated form the plurality of electrode patterns.

The method also may optionally further include adjusting the spherical focal power of the varifocal optical assembly by changing the voltage applied to the spherical electrode pattern.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A varifocal optical assembly comprising:
   a first liquid crystal lens including a liquid crystal layer disposed between opposing substrates;
   a first electrode pattern disposed on at least one substrate, wherein the first electrode pattern includes a set of two or more parallel conductors each having a length proportional to the longest dimension of a clear aperture of the liquid crystal lens, wherein adjacent conductors of the set of two or more parallel conductors are separated by a gap and are configured to generate a voltage distribution within the liquid crystal layer that results in the liquid crystal layer exhibiting cylindrical focal power, wherein widths of parallel conductors of the set of two or more parallel conductors decrease from a center of the clear aperture of the liquid crystal lens to opposing outside edges of the clear aperture of the liquid crystal lens in a direction of the widths of the parallel conductors and proportional to a square of a distance of each parallel conductor to the center of the clear aperture of the liquid crystal lens, and a second electrode pattern disposed on the at least one substrate and electrically isolated from the first electrode pattern, wherein the second electrode pattern includes a second set of two or more parallel conductors each having a length proportional to the longest dimension of the clear aperture of the liquid crystal lens, wherein the second set of two or more parallel conductors is configured to generate a voltage distribution within the liquid crystal layer that results in the liquid crystal layer exhibiting cylindrical focal power, wherein a width direction of the second electrode pattern is at an angle relative to a width direction of the first electrode pattern.

2. The varifocal optical assembly of claim 1, further comprising:

a third electrode pattern disposed on the at least one substrate and electrically isolated from both the first and second electrode patterns, wherein the third electrode pattern includes a set of concentric conductors configured to generate a voltage distribution within the liquid crystal layer that results in the liquid crystal layer exhibiting spherical focal power.

3. The varifocal optical assembly of claim 2, wherein each of the concentric conductors of the third electrode pattern has a radial width that decreases from the center of the clear aperture of the liquid crystal lens to an outside edge of the clear aperture of the liquid crystal lens and is proportional to the square of the distance of each conductor to the center of the clear aperture of the liquid crystal lens.

4. The varifocal optical assembly of claim 2, wherein the varifocal optical assembly is polarization insensitive.

5. The varifocal optical assembly of claim 4, further comprising:

a second liquid crystal lens including a second liquid crystal layer disposed between opposing substrates;

a fourth electrode pattern disposed on at least one substrate of the second liquid crystal lens, wherein the first electrode pattern includes a set of two or more parallel conductors each having a length proportional to the longest dimension of the clear aperture of the liquid crystal lens, wherein the set of two or more parallel conductors is configured to generate a voltage distribution within the liquid crystal layer that results in the liquid crystal layer exhibiting cylindrical focal power; and a fifth electrode pattern disposed on the at least one substrate of the second liquid crystal lens and electrically isolated from the first electrode pattern, wherein the second electrode pattern includes a set of concentric conductors configured to generate a voltage distribution within the liquid crystal layer that results in the liquid crystal layer exhibiting spherical focal power, wherein the first liquid crystal lens is configured for a first polarization of light and the second liquid crystal lens is configured for a second polarization of light orthogonal to the first polarization of light.

6. The varifocal optical assembly of claim 2, wherein the set of two or more parallel conductors of the first electrode pattern is segmented into two or more groups of adjacent conductors electrically connected in series, each group having a first conductor closest to the center of the clear aperture of the liquid crystal lens and connected to a positive voltage supply and a last conductor farthest from the center of the clear aperture of the liquid crystal lens connected to a negative voltage supply.

7. The varifocal optical assembly of claim 6, wherein a voltage of successive conductors within the two or more groups decreases or increases linearly from the first conductor closest to the center of the clear aperture to the last conductor farthest from the center of the clear aperture of the liquid crystal lens.

8. The varifocal optical assembly of claim 7, wherein voltage applied to the first conductor of each of the two or more groups is the same, and wherein the voltage of successive conductors within the two or more groups are the same.

9. A head mounted display comprising:

a display configured to emit image light; and a varifocal optical assembly configured to provide astigmatism compensation, the varifocal optical assembly comprising:

a first liquid crystal lens including a liquid crystal disposed between opposing substrates;

a first electrode pattern disposed on at least one substrate, wherein the first electrode pattern includes a set of two or more parallel conductors each having a length proportional to the longest dimension of a clear aperture of the liquid crystal lens, wherein adjacent conductors of the set of two or more parallel conductors are separated by a gap and are configured to generate a voltage distribution within the liquid crystal layer that results in the liquid crystal layer exhibiting cylindrical focal power, wherein widths of parallel conductors of the set of two or more parallel conductors decrease from a center of the clear aperture of the liquid crystal lens to opposing outside edges of the clear aperture of the liquid crystal lens in a direction of the widths of the parallel conductors and proportional to a square of a distance of each parallel conductor to the center of the clear aperture of the liquid crystal lens, and a second electrode pattern disposed on the at least one substrate and electrically isolated from the first electrode pattern, wherein the second electrode pattern includes a second set of two or more parallel conductors each having a length proportional to the longest dimension of the clear aperture of the liquid crystal lens, wherein the second set of two or more parallel conductors is configured to generate a voltage distribution within the liquid crystal layer that results in the liquid crystal layer exhibiting cylindrical focal power, wherein a width direction of the second electrode pattern is at an angle relative to a width direction of the first electrode pattern.

10. The head mounted display of claim 9, further comprising:

a third electrode pattern disposed on the at least one substrate and electrically isolated from both the first and second electrode patterns, wherein the third electrode pattern includes a set of concentric conductors configured to generate a voltage distribution within the liquid crystal layer that results in the liquid crystal layer exhibiting spherical focal power.

11. The head mounted display of claim 10, wherein the varifocal optical assembly is polarization insensitive.

12. The head mounted display of claim 11, further comprising:
a second liquid crystal lens assembly including a liquid crystal disposed between opposing substrates;
a fourth electrode pattern disposed on at least one substrate of the second liquid crystal lens, wherein the first electrode pattern includes a set of two or more parallel conductors each having a length proportional to the longest dimension of the clear aperture of the liquid crystal lens, wherein the set of two or more parallel conductors is configured to generate a voltage distribution within the liquid crystal layer that results in the liquid crystal layer exhibiting cylindrical focal power; and
a fifth electrode pattern disposed on the at least one substrate of the second liquid crystal lens and electrically isolated from the first electrode pattern, wherein the second electrode pattern includes a set of concentric conductors configured to generate a voltage distribution within the liquid crystal layer that results in the liquid crystal layer exhibiting spherical focal power,
wherein the first liquid crystal lens is configured for a first polarization of light and the second liquid crystal lens is configured for a second polarization of light orthogonal to the first polarization of light.

13. The head mounted display of claim 11, wherein the set of two or more parallel conductors of the first electrode pattern is segmented into two or more groups of adjacent conductors electrically connected in series, each group having a first conductor closest to the center of the clear aperture of the liquid crystal lens and connected to a positive voltage supply and a last conductor farthest from the center of the clear aperture of the liquid crystal lens connected to a negative voltage supply.

14. The head mounted display of claim 13, wherein a voltage of successive conductors within the two or more groups decreases or increases linearly from the first conductor closest to the center of the clear aperture to the last conductor farthest from the center of the clear aperture of the liquid crystal lens.

15. The head mounted display of claim 13, wherein voltage applied to the first conductor of each of the two or more groups is the same, and wherein the voltage of successive conductors within the two or more groups are the same.

16. A method comprising:
transmitting light through a varifocal optical assembly configured to provide astigmatism compensation, the varifocal optical assembly comprising:
a first liquid crystal lens including a liquid crystal layer disposed between opposing substrates;
a first electrode pattern disposed on at least one substrate, wherein the first electrode pattern includes a set of two or more parallel conductors each having a length proportional to the longest dimension of a clear aperture of the liquid crystal lens, wherein adjacent conductors of the set of two or more parallel conductors are separated by a gap and are configured to generate a voltage distribution within the liquid crystal layer that results in the liquid crystal layer exhibiting cylindrical focal power,
wherein widths of parallel conductors of the set of two or more parallel conductors decrease from a center of the clear aperture of the liquid crystal lens to opposing outside edges of the clear aperture of the liquid crystal lens in a direction of the widths of the parallel conductors and proportional to a square of a distance of each parallel conductor to the center of the clear aperture of the liquid crystal lens, and
a second electrode pattern disposed on the at least one substrate and electrically isolated from the first electrode pattern, wherein the second electrode pattern includes a second set of two or more parallel conductors each having a length proportional to the longest dimension of the clear aperture of the liquid crystal lens, wherein the second set of two or more parallel conductors is configured to generate a voltage distribution within the liquid crystal layer that results in the liquid crystal layer exhibiting cylindrical focal power, wherein a width direction of the second electrode pattern is at an angle relative to a width direction of the first electrode pattern;
determining an astigmatism correction axis; and
adjusting the cylindrical focal power of the varifocal optical assembly configured to provide astigmatism compensation by changing a voltage applied to the conductors of at least one of the first electrode pattern or the second electrode pattern based on the astigmatism correction axis.

17. The method of claim 16, wherein the varifocal optical assembly configured to provide astigmatism compensation further includes a spherical correction electrode pattern disposed on the at least one substrate of the liquid crystal lens assembly and electrically isolated both the first and second electrode patterns, and further comprising:
adjusting the spherical focal power of the varifocal optical assembly by changing the voltage applied to the spherical electrode pattern.

* * * * *